(12) United States Patent
Schmidt et al.

(10) Patent No.: US 9,597,825 B2
(45) Date of Patent: Mar. 21, 2017

(54) MULTILAYER BODY

(75) Inventors: Jurgen Schmidt, Roth (DE); Gert Jungmann, Fürth (DE); Juri Attner, Burgthann (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 1122 days.

(21) Appl. No.: 13/381,595

(22) PCT Filed: Jun. 18, 2010

(86) PCT No.: PCT/EP2010/003695
§ 371 (c)(1),
(2), (4) Date: Mar. 2, 2012

(87) PCT Pub. No.: WO2011/000485
PCT Pub. Date: Jan. 6, 2011

(65) Prior Publication Data
US 2012/0156445 A1    Jun. 21, 2012

(30) Foreign Application Priority Data
Jul. 1, 2009   (DE) .................. 10 2009 031 478

(51) Int. Cl.
| | | |
|---|---|---|
| *B32B 3/10* | (2006.01) | |
| *B29C 43/30* | (2006.01) | |
| *B29C 43/22* | (2006.01) | |
| *B29C 45/14* | (2006.01) | |
| *B32B 27/08* | (2006.01) | |
| *B32B 7/12* | (2006.01) | |
| *B32B 27/30* | (2006.01) | |
| *B32B 27/32* | (2006.01) | |

(Continued)

(52) U.S. Cl.
CPC .......... *B29C 43/305* (2013.01); *B29C 43/222* (2013.01); *B29C 45/14811* (2013.01);
(Continued)

(58) Field of Classification Search
CPC .................................................. B29C 43/305
See application file for complete search history.

(56) References Cited

U.S. PATENT DOCUMENTS

| 3,417,175 A | 12/1968 | Brown et al. |
| 4,837,072 A | 6/1989 | Kraetschmer |
| (Continued) | | |

FOREIGN PATENT DOCUMENTS

| DE | 8616114 | 10/1986 |
| DE | 10013410 | 9/2001 |
| (Continued) | | |

OTHER PUBLICATIONS

Machine translation of JP-2008221850 retrieved on Feb. 23, 2015.*

*Primary Examiner* — Christopher Polley
(74) *Attorney, Agent, or Firm* — Hoffmann & Baron LLP

(57) ABSTRACT

The invention relates to a multilayer body (100) for producing a decorated plastic article (50) having a surface relief (40). The multilayer body (100) comprises a relief film (1) with a first carrier film (2) and a structural layer (3), arranged on one side of the first carrier film (2). The multilayer body (100) also comprises a multilayer film (5) with a second carrier film (10) and at least one decorative layer (12, 14). The structural layer (3) is arranged here between the first carrier film (2) and the second carrier film (10). Furthermore, the multilayer body (100) has a film body (19) which comprises the relief film (1) and can be released from the at least one decorative layer (12, 14), and the at least one decorative layer (12, 14) is formed such that it can be deformed by the structural layer (3) formed as a stamped structure. The invention also relates to a process for producing such a multilayer body (100), and to two processes for producing a decorated plastic article (50) having a surface relief (40) by using such a multilayer body (100).

23 Claims, 17 Drawing Sheets

(51) Int. Cl.
  *B32B 27/36* (2006.01)
  *B32B 3/26* (2006.01)
  *B32B 3/30* (2006.01)
  *B29L 31/30* (2006.01)

(52) U.S. Cl.
  CPC .......... *B29C 45/14827* (2013.01); *B32B 3/26* (2013.01); *B32B 3/30* (2013.01); *B32B 7/12* (2013.01); *B32B 27/08* (2013.01); *B32B 27/302* (2013.01); *B32B 27/308* (2013.01); *B32B 27/32* (2013.01); *B32B 27/36* (2013.01); *B32B 27/365* (2013.01); *B29L 2031/302* (2013.01); *B32B 2250/24* (2013.01); *B32B 2255/10* (2013.01); *B32B 2255/205* (2013.01); *B32B 2255/26* (2013.01); *B32B 2255/28* (2013.01); *B32B 2451/00* (2013.01); *B32B 2457/00* (2013.01); *B32B 2605/003* (2013.01); *Y10T 428/24802* (2015.01)

(56) References Cited

U.S. PATENT DOCUMENTS

| | | |
|---|---|---|
| 5,234,729 A | 8/1993 | Wheatley et al. |
| 5,536,539 A | 7/1996 | Ellison et al. |
| 6,117,538 A | 9/2000 | Hirata et al. |
| 6,455,228 B1 | 9/2002 | Tachikawa et al. |
| 2004/0164448 A1 | 8/2004 | Olsson et al. |
| 2005/0026038 A1 | 2/2005 | Hall et al. |
| 2005/0221056 A1 | 10/2005 | Schwonke et al. |
| 2005/0255314 A1* | 11/2005 | Wang et al. .................. 428/352 |
| 2008/0032070 A1 | 2/2008 | Hirschfelder et al. |
| 2008/0213541 A1 | 9/2008 | Schilling et al. |
| 2010/0151207 A1 | 6/2010 | Hansen et al. |

FOREIGN PATENT DOCUMENTS

| | | |
|---|---|---|
| DE | 10214100 | 10/2003 |
| DE | 102004041868 | 3/2006 |
| DE | 102005006074 | 8/2006 |
| DE | 102005017170 | 10/2006 |
| JP | H02-95817 | 4/1990 |
| JP | 2003312193 | 11/2003 |
| JP | 2006305898 | 11/2006 |
| JP | 2007-268942 | 10/2007 |
| JP | 2008-510638 | 4/2008 |
| JP | 2008-221850 | 9/2008 |
| TW | 257728 | 9/1995 |
| TW | 4127943 | 4/2001 |
| TW | 500976 | 9/2002 |
| TW | 558460 | 10/2003 |

* cited by examiner

MULTILAYER BODY

This application claims priority based on an International Application filed under the Patent Cooperation Treaty, PCT/EP2010/003695, filed on Jun. 18, 2010, and German Application No. DE 102009031428.4, filed on Jul. 1, 2009.

BACKGROUND OF THE INVENTION

The invention relates to a multilayer body for producing a decorated plastic article having a surface relief and to a process for producing such a multilayer body. The invention also relates to two processes for producing a decorated injection-molded article having a surface relief by using such a multilayer body.

Decorated plastic articles having a surface relief, for example injection-molded articles, processes for the production thereof, and multilayer bodies such as inmolding transfer films or IMD films for use in these processes are known (IMD=Inmold Decoration). Decorated injection-molded articles with tactile structures are used in particular for interior automobile parts such as door trims, strips in instrument panels, gearshift lever covers and center console covers, for exterior automobile parts, such as door guard strips and coverings on A, B and C pillars, in the audio and video sector for decorative strips on housings of radio and television sets, and in the telecommunications sector for housing shells of portable devices, such as cellphones or navigation equipment.

Thus, the patent specification DE 10 2004 041 868 B3 discloses a transfer film comprising a carrier with a first side and a second side, a release layer being arranged on the first side of the carrier film and a transfer layer being arranged on the side of the release layer that is facing away from the carrier film, and a structural layer of a structuring lacquer being partially arranged on the second side of the carrier film. The relief structure of the structural layer presses through the carrier film onto the transfer layer under the high pressures occurring during the injection molding or hot stamping. The use of such a transfer film for inmold injection molding makes it possible to form three-dimensional structures in the region of the transfer layer on a plastic article decorated with such a layer, it being possible, depending on the arrangement of the structural layer, to produce a positive or negative three-dimensional image of the structural layer on the plastic article and the transfer layer bonded thereto.

SUMMARY OF THE INVENTION

It is thus the object of the invention to provide an improved multilayer body for producing a decorated plastic article having a surface relief that makes quicker, and consequently lower-cost, production of injection-molded articles possible and at the same time is more flexible, and consequently better suited than the previously known film systems for thermoforming processes with high requirements in terms of stretchability. In addition, it is intended to provide a process for producing such an improved multilayer body. Furthermore, it is intended to provide two low-cost processes for producing a decorated plastic article having a surface relief that make quicker and lower-cost production of plastic articles possible by using the multilayer body according to the invention.

The object is achieved for the multilayer body for producing a decorated plastic article having a surface relief by the multilayer body comprising a relief film with a first carrier film and a structural layer, arranged on one side of the first carrier film, and a multilayer film with a second carrier film and at least one decorative layer, the structural layer being arranged between the first carrier film and the second carrier film, the multilayer body having a film body which comprises the relief film and can be released from the at least one decorative layer, and it being possible for the at least one decorative layer to be deformed by the structural layer formed as a stamped structure.

The multilayer body according to the invention consists of a transfer layer and a film body which can be released therefrom and comprises the relief film. The transfer layer comprising the at least one decorative layer bonds to an injection-molding compound or a substrate. The film body is released from the transfer layer once a bond between the transfer layer and the injection-molding compound or the substrate has been established. This is possible since the adherence of the transfer layer on the injection-molding compound or the substrate is greater than the adherence of the film body on the transfer layer. The free surface of the transfer layer bonded to the injection-molding compound or the substrate that forms as a result of the release of the film body from the transfer layer has a free surface relief, which has been stamped into the transfer layer during the production of the bond between the transfer layer and the injection-molding compound or the substrate by means of the structural layer formed as a stamped structure.

If such a multilayer body is used for producing a decorated plastic article having a surface relief, in particular in an IMD, IM or IML process or in hot stamping, the structural layer does not come into contact with any surface of a tool on account of it being arranged between the first carrier film and the second carrier film (IM=Insert Molding; IML=Inmold Labeling). In this way, possible contamination of the tool surface by the structural layer is ruled out. The multilayer body according to the invention therefore permanently avoids the problem occurring with conventional multilayer bodies that, over a large number of production cycles, such contaminations accumulate on the tool surface and, as a result of this, undesired surface effects, such as for example relief structures, form on the decorated plastic articles. This disadvantageous effect with conventional multilayer bodies occurs especially in the case of printed-on structural layers, for example if structural lacquer is used.

The object is achieved for a process for producing a multilayer body according to the invention by the following steps: a) providing a relief film, with a first carrier film and a structural layer arranged on one side of the first carrier film; b) providing a multilayer film, with a second carrier film and at least one decorative layer; and c) bonding the relief film and the multilayer film such that the structural layer is arranged between the first carrier film and the second carrier film.

It has proven successful to provide the multilayer body according to the invention as a two-part film assembly, formed by two separate films each with one or more carrier film(s). In this case, a first part of the film assembly is a conventional inmolding multilayer film and the second part is a relief film, i.e. a film with the structural layer. The two parts are bonded to one another by conventional techniques in an easy and quick way to form the film assembly such that the carrier film of the relief film is lying against the tool surface and the structural layer of the relief film is facing away from the tool surface. An "inmolding" film should be understood as meaning a film which is suitable as a decorative film for decorating an injection-molded body in an IMD, IM or IML process. A decorative film is a film which has at least one decorative layer.

This provides a high degree of flexibility with respect to the choice of materials that are used in the multilayer body and with respect to curing processes, which is of considerable advantage. Thus, the multilayer film and the relief film may respectively comprise not yet cured, or at least not yet completely cured, layers or layer regions, which can be cured or post-cured independently of one another. The process according to the invention for producing the multilayer body allows the structural layer of the relief film and the at least one decorative layer of the multilayer film to be treated independently of one another, in particular at different points in time. It is possible at a point in time before the multilayer film and the relief film are bonded to completely cure the structural film and not to cure, or merely to pre-cure, the at least one decorative layer. In this case, it is preferred to completely cure the at least one decorative layer only when it is arranged as the decoration on the decorated plastic article having a surface relief. There is not this flexibility with conventional IMD films, in the case of which the relief structure is applied to the IMD film. Since, with conventional IMD films, the relief structure is arranged directly on the IMD film, the decoration is necessarily likewise completely cured at the same time as the complete curing of the relief structure. A post-curing of the decoration independently of the curing operation for the structural layer, as is possible in the case of the process according to the invention, is therefore not possible with conventional film systems.

The at least not yet completely cured layer is also referred to as a layer to be cured. In the sense intended in the present invention, "not yet completely cured" refers to a layer when its hardness and/or resistance does not yet have a fixed minimum value. Generally, the fixed minimum value of the hardness and/or the resistance is a function of the final intended purpose of the layer, for example as a protective lacquer layer or as an intermediate layer for forming an optical effect. For the purposes of the present description, "completely cured" consequently refers to a layer when its hardness and/or resistance has a fixed minimum value.

It is possible that the aforementioned minimum values are fixed such that a layer is referred to as "not yet completely cured" in the sense intended in the present invention when no more than 95% of the polymer constituents of the layer that are capable of undergoing crosslinking exhibit crosslinking.

Consequently, a layer is referred to as "completely cured" in the sense intended in the present invention when more than 95% of the polymer constituents of the layer that are capable of undergoing crosslinking exhibit crosslinking. A completely cured layer is obtained when complete crosslinking, i.e. >95% crosslinking, of its polymer constituents has taken place.

A further advantage of the process according to the invention for producing the multilayer body is the possibility of bonding the relief film and the multilayer film in any desired relative arrangement with respect to one another. This particularly allows the structural layer and the at least one decorative layer to be arranged and bonded on one another in exact register. A precise matching of the haptic structure with the decoration is therefore possible.

The object is achieved for a first process for producing a decorated injection-molded article having a surface relief by the following steps: A) arranging a multilayer body according to the invention in an injection mold in such a way that the first carrier film lies against an inner wall of the injection mold; B) insert molding the multilayer body by injecting a plastics injection-molding compound onto it in such a way that the structural layer stamps a relief onto one or more of the at least one decorative layer(s); C) curing the plastics injection-molding compound to form a plastics material; D) removing the cured plastics material, including the multilayer body arranged thereupon, from the injection mold; and E) pulling off a film body comprising the relief film from the plastics material and the at least one decorative layer firmly bonded thereto, with the plastics material and the at least one decorative layer firmly bonded thereto providing the decorated injection-molded article having a surface relief.

This first process for producing a decorated injection-molded article having a surface relief uses the multilayer body according to the invention; it therefore corresponds to a use of the multilayer body according to the invention for producing a decorated injection-molded article having a surface relief.

The object is achieved for a second process for producing a decorated plastic article having a surface relief by means of hot stamping by the following steps: α) arranging a multilayer body according to the invention on a substrate in such a way that the relief film is facing away from the substrate; β) hot stamping the multilayer body onto the substrate; and γ) pulling off a film body comprising the relief film from the substrate and the at least one decorative layer firmly bonded thereto, with the substrate and the at least one decorative layer firmly bonded thereto providing the decorated plastic article having a surface relief. The substrate may in this case be a body of plastic or an underlay of paper, paperboard or other fibrous material such as a textile. For step β), a stamping tool such as a roller or a punch is used, the surface of which preferably consists of metal or silicone.

This second process for producing a decorated plastic article having a surface relief by means of hot stamping uses the multilayer body according to the invention; it therefore corresponds to a use of the multilayer body according to the invention for producing a decorated plastic article having a surface relief.

In the case of this second process, as also in the case of the first process described above, the structural layer fashioning the surface relief does not come into contact with the surface of the stamping tool, thereby avoiding undesired contamination of the surface of the stamping tool. In this case, the surface of the stamping tool may be formed as an inner wall of an injection mold or a surface of a hot stamping roller or a hot stamping punch. The avoidance of undesired contamination of the surface of the stamping tool is particularly advantageous when this surface has a high temperature, depending on the material and the process, preferably in the range of greater than 70° C., as particularly in the case of a heated stamping roller or a heated stamping punch, since removal of contaminations is very laborious in this case.

Both processes are characterized in that, to form the surface relief of the plastic body, i.e. the injection-molded article or plastic article, comprising a plastics material and a deformable laminate arranged thereupon, a relief is stamped into the deformable laminate by means of a stamped structure, the stamping or structuring operation taking place at the same time as the bonding of the plastics material and the deformable laminate. The surface relief according to the invention is therefore not formed by arranging on the plastics material an element that is already in a structured form, for example in the form of a relief, for example a structural layer formed as part of a transfer layer, with the structuring operation for the element and the bonding of the plastics material and the structured element being two separate process steps, but is formed by a relief stamped into the deformable laminate. According to the present invention, the stamped structure is not a preferably metallic stamping tool, such as for example a stamping punch or a replicating roller, but rather a structural layer of a relief film.

The deformable laminate arranged on the plastics material is preferably formed by the transfer layer of the multilayer body. The structural layer formed as a stamped structure has a relief, which is stamped into the deformable laminate. The relief has elevated regions, i.e. peaks, and depressed regions between these elevated regions, i.e. troughs.

It is preferred if the multilayer body has a release layer, by means of which the film body can be released from the transfer layer, and consequently from the at least one decorative layer. The release layer divides the multilayer body into the transfer layer and the film body that can be released therefrom. It is preferred if the release layer forms part of the releasable film body, i.e. is removed when the film body is released from the transfer layer. In this case it is possible that the release layer is formed as a separate layer, in particular a wax layer. It is similarly possible that a surface of the film body forms the release layer, in particular by suitable material pairing of the mutually adjacent layers of the film body and the transfer layer.

It has proven successful if the first carrier film is a polyester film. The carrier film may be of any desired material, for example ABS (=acrylonitrile-butadiene-styrene), PEN (=polyethylene naphthalate), PC (=polycarbonate), PMMA (=polymethyl methacrylate), but preferably of PET (=polyethylene terephthalate). It has also proven successful if the first carrier film has a thickness in the range from 12 to 50 µm, preferably in the range from 16 to 23 µm.

It has proven successful if the second carrier film is a polyester film or an ABS film. The carrier film may be of any desired material, for example PEN or PC or PMMA, but preferably of PET or ABS. It is preferred if the second carrier film is transparent.

It is possible that the multilayer film is formed as a transfer film which has, adjoining the structural layer in the following sequence, the second carrier film, a release layer and the at least one decorative layer. In this case, it may be of advantage if the transfer film has on the side of the at least one decorative layer that is facing away from the release layer a primer layer. Such a multilayer film may be used in an IMD process. In this case, the second carrier film is preferably formed as a polyester film. It has proven successful if the second carrier film, formed as a polyester film, has a thickness in the range from 12 to 50 µm, preferably in the range from 16 to 23 µm.

It is possible that the multilayer film is formed as a transfer film which has, adjoining the structural layer in the following sequence, the second carrier film, a release layer, a first decorative layer, an intermediate lacquer layer, one or more second decorative layer(s) and a primer layer. The first decorative layer may be formed as a chemically and/or physically crosslinked lacquer system, i.e. a pre- and post-curable lacquer, with a thickness in the range from 5 to 20 µm, preferably in the range from 5 to 10 µm. The intermediate lacquer layer may be formed as a lacquer layer with a thickness in the range from 0.5 to 4 µm, preferably in the range from 0.8 to 1.2 µm. The one or more second decorative layer(s) may be formed as up to eight decorative lacquer layers, preferably two to eight decorative lacquer layers, each with a thickness in the range from 0.5 to 4 µm, preferably in the range from 0.8 to 1.2 µm. Therefore, a maximum thickness of the range from 0.5 to 32 µm is obtained for the entire decorative layer assembly of the one or more second decorative layer(s). The primer layer may be formed as a primer and/or adhesive layer with a thickness per layer in the range from 0.5 to 4 µm, preferably in the range from 0.8 to 1.2 µm.

It is also possible that the multilayer film is formed as an IM-ing film which comprises, adjoining the structural layer in the following sequence, the at least one decorative layer and the second carrier film. Such a multilayer film may be used in an IM or IML process. In this case, the second carrier film is preferably formed as an ABS film. It has proven successful if the second carrier film, formed as an ABS film, has a thickness in the range from 200 to 750 µm. Before the insert molding, such a multilayer film may be pre-formed, in particular by means of vacuum forming, in a way corresponding to the form of the injection-molded part.

It has proven successful if the structural layer comprises a material that can be cured by means of radiation, preferably electromagnetic radiation or particle radiation, or is formed from such a material. The structural layer may, however, also be produced from a thermally curing material. The structural layer may be produced from a structural lacquer, also referred to as a structuring lacquer, which cures/crosslinks/dries thermally or by UV. It is possible, in an easy and low-cost way, that the structural layer is printed onto the first carrier film in the required layer thickness. Gravure printing or screen printing may be used as the printing process.

It has proven particularly successful if the structuring lacquer comprises a thermoset or thermoplastic with a glass transition temperature $T_g$ above 200° C. However, it has also proven successful to use a structuring lacquer of a non-crosslinking lacquer system filled with a filler, the filler preferably being formed by inorganic fillers, such as for example titanium dioxide. Such structuring lacquers are dimensionally stable and compression-resistant to high temperatures, so that deformation of the structural layer does not take place under injection-molding or hot-stamping conditions, or only to an extremely small extent. Here it has proven particularly successful if the structuring lacquer is a radiation-curable, an EBC-curable, an epoxy-curable, an isocyanate-curable or an acid-curable lacquer (EBC=electron-beam curing). Such crosslinking lacquers have the required dimensional and compressive stability at high processing temperatures and can also be processed well with a high solids content. It is particularly preferred in this respect if the structuring lacquer has a solids content of at least 40%, preferably of 100%. The high solids content increases the achievable layer thickness of the structural layer and improves the transcription capability of the structural layer. Consequently, the achievable depth of the three-dimensional structures is increased.

The structural layer is preferably produced by means of a UV-curable lacquer (UV=ultraviolet radiation). It is particularly preferred if the structural layer is printed onto the first carrier film as a lacquer layer comprising a UV-curable lacquer in a screen-printing process, because with such a lacquer a particularly precisely formed structure is possible without the lacquer running or becoming indistinct, i.e. the wet-printed structure substantially corresponds to the cured structure, and the screen-printing process makes it possible for a structure to be applied with particularly great layer thicknesses, in particular in the range from 5 to 150 µm. With differently curing lacquers, for example thermally curing lacquers, in particular with solvent-containing lacquers, outgassing during the curing/drying may lead to dimensional changes in the relief structure, so that the wet-printed structure does not substantially correspond to the cured structure.

For the processes according to the invention, the structure depth of the structural layer is decisive for the producible depth of the three-dimensional structuring, i.e. of the surface relief. It goes without saying that the thickness of the structural layer on the first carrier film may be formed differently, so that three-dimensional structures of different depths can be produced simultaneously.

It is preferred if the structural layer of the multilayer body is completely cured. This can be achieved particularly easily if the structural layer comprises a radiation-curable lacquer. Furthermore, it is preferred if the at least one decorative layer of the multilayer body is not completely cured. This can be achieved particularly easily if the at least one decorative layer comprises a radiation-curable lacquer. It has proven successful that the structural layer of the multilayer body is completely cured and the at least one decorative layer of the multilayer body is not completely cured. For this purpose, the structural layer is completely cured before the bonding of the relief film and the multilayer film, in order that the relief structure of said layer is not changed during the insert molding or hot stamping, and so the desired surface relief is fashioned in one or more of the at least one decorative layer(s). By contrast with the structural layer, in this case the at least one decorative layer is not yet completely cured during the insert molding or hot stamping, in order that it remains well deformable and the relief of the structural layer can be stamped in it. The good deformability of the at least one decorative layer is also advantageous for forming processes for the multilayer body, for example vacuum forming or thermoforming, which for example in the case of an IM or IML process take place before the insert molding or hot stamping.

It is also possible that the structural layer takes the form of a partially formed metal layer, for example of aluminum, copper, silver or gold, on the first carrier film, which metal layer has been produced by means of known metal-coating and structuring processes, for example a demetallizing process using a positive or negative photoresist as an etching resist and etching by means of etchant.

It is also possible that the structural layer is a replicating layer, for example a replicating lacquer layer, in which macroscopic and/or microscopic relief structures are stamped. For this purpose, a radiation-curable or thermally curable replicating lacquer layer may be applied to the first carrier film, an impression of the relief formed in the replicating lacquer layer and the replicating lacquer layer cured. The cured replicating lacquer layer with the relief stamped in it forms the structural layer. In this way, the relief formed as an impression in the replicating lacquer layer by means of a stamping punch forms after the curing of the replicating lacquer a stamping punch with which, in turn, a relief can be stamped onto the multilayer film.

Preferably, the structural layer is formed from a material, particularly a structuring lacquer, of which the compressive strength is substantially constant, at least up to a temperature of 200° C. In this way, the dimensional stability of the stamped structure of the structural layer is substantially ensured. If such a structural layer is used in an injection-molding process or during the hot stamping, the structural layer is not deformed, or only insignificantly, because plastics injection-molding compounds are usually injected at temperatures below 200 to 300° C. into tools at a temperature of approximately 30 to 70° C. and hot stamping usually likewise takes place below 230° C.

The structural layer is formed as a stamped structure which has elevated and depressed regions. It is preferred that the depressed regions of the stamped structure are formed as voids and/or comprise a material, particularly an adhesive, which is softer, i.e. more compressible, than the structures of the structural layer. Preferably, a void is formed by the following areas a) to c) enclosing the void: a) either depressed regions of the structural layer or another layer (for example an adhesive layer) which is arranged between the void and the first carrier film or the first carrier film itself; b) neighboring elevated regions of the structural layer; c) either the second carrier film itself or a layer (for example an adhesive layer) which is arranged between the void and the second carrier film.

The voids may be filled with a gas, for example air or carbon dioxide, or evacuated. The voids may be partially or completely filled with one or more solid or liquid material(s). In this case, the one or more material(s) that fill the depressed regions is/are so compressible that, when pressure is applied to the multilayer body during an injection-molding or hot-stamping process, the deforming of the multilayer film into the depressed regions of the structural layer is not significantly hindered by these materials, or at least not completely prevented. It is possible that a void is partly filled with an adhesive and the remaining volume is filled with a compressible gas, so that the deforming of the multilayer film into the depressed regions of the structural layer is possible. It is also possible that a void is completely filled with an adhesive which is compressible to the extent specified above, so that the deforming of the multilayer film into the depressed regions of the structural layer is possible.

It is preferred if the multilayer film does not have any deformation originating from the structural layer. In this, case it is preferred if the relief film and the multilayer film are bonded during the production of the multilayer body, without the structural layer formed as a stamped structure stamping a relief into one or more layer(s) of the multilayer film.

It is preferred if a layer of the multilayer body which is arranged on a side of the structural layer that is facing away from the first carrier film, directly adjacent the structural layer, has a constant layer thickness, in particular both in the elevated regions and in the depressed regions of the structural layer. It is preferred if a layer of the multilayer body which is arranged on a side of the structural layer that is facing away from the first carrier film, directly adjacent the structural layer, has before the insert molding or hot stamping of the multilayer body according to the invention a preferably planar surface contour which is independent of the relief structure of the structural layer.

It is possible that the structural layer has a thickness in the range from 5 to 250 µm, preferably in the range from 10 to 70 µm. It is possible that the structural layer has a structure depth in the range from 5 to 250 µm. It is possible that neighboring elevated regions and/or neighboring depressed regions of the structural layer have a spacing in the range from 11 µm to 50 cm, preferably in the range from 100 µm to 5 mm. The parameters of the structural layer, such as thickness, structure depth and spacing, are chosen according to the desired haptic structure of the surface relief.

It is possible that an adhesive layer is applied to the side of the structural layer that is facing away from the first carrier film. It is possible that an adhesive layer is arranged directly on the side of the structural layer that is facing away from the first carrier film. It is preferred if the adhesive layer has a thickness in the range from 0.5 to 4 µm, particularly preferably in the range from 0.5 to 2 µm. The adhesive layer may be thinner, of the same thickness or thicker than the structure depth of the structural layer. Preferably, however, the adhesive is formed very thinly, i.e. thinner than the structure depth of the structural layer.

It is possible that a so-called pressure-sensitive adhesive, for example based on polyurethane (=PUR) serves as the adhesive. However, any desired suitable adhesive that is a physically drying adhesive and is capable of adhesively bonding the relief film and the multilayer film to one another may serve this purpose. Any desired printing process may be chosen as the application process for applying the adhesive layer. It is possible that the haptic structures of the structural layer are overfilled by the adhesive of the adhesive layer. The very hard structures of the structural layer, preferably of very hard UV-curing lacquer, are capable of pressing themselves through the very much softer adhesive.

It is possible that an adhesive layer is applied to the side of the multilayer film that is facing toward the relief film. As an alternative to two adhesive layers, one on the structural layer and one on the side of the multilayer film that is facing toward the structural layer, it is also possible to apply only one adhesive layer, either on the relief film or on the multilayer film.

It is preferred if the side of the first carrier film that is facing away from the structural layer is uncoated. In the case of a blank first carrier film, contaminations of the tool surface, for example of an injection mold or a punch, are reliably avoided. It has also proven successful if the multilayer body is arranged in the injection mold in such a way that the first carrier film lies directly against the inner wall of the injection mold.

Preferably, the structural layer is given the form of a regular or irregular pattern and/or the form of alphanumeric characters and/or the form of pictorial representations on the carrier film. It is possible that the structural layer forms a positive or a negative for a pattern, an alphanumeric character or a pictorial representation. The structural layer forms a relief which is stamped onto one or more of the at least one decorative layer(s). It is preferred if one of the one or more of the at least one decorative layer(s) on which a relief has been stamped form(s) a surface of the finished-decorated plastic article.

It is possible that the structural layer has a relief which is given the form of a regular or irregular pattern and/or the form of alphanumeric characters and/or the form of pictorial representations on the carrier film. It is possible that the relief of the structural layer forms a positive or a negative for a pattern, an alphanumeric character or a pictorial representation which is stamped in a plastic article as a free surface relief.

Depending on the arrangement of the structural layer and the at least one decorative layer, the design chosen for the structural layer will be a positive or a negative for the pattern, the alphanumeric character or the pictorial representation. If the first carrier film including the structural layer is removed, a negative image of the structural layer remains as a surface relief, i.e. three-dimensional structuring, of the plastic body, which means that the regions of the at least one decorative layer in which the first carrier film was free from the structural layer or in which depressed regions of the structural layer were located represent the elevated regions of the surface relief, while the regions of the at least one decorative layer in which a structural layer was provided or in which elevated regions of the structural layer were located represent the—possibly differently—depressed regions of the surface relief.

It is possible that the at least one decorative layer comprises at least one protective layer and/or at least one layer with a decorative effect. In the sense intended in the present invention, the term "decorative layer" may refer to a protective layer or a layer with a decorative effect.

It is possible that the at least one decorative layer is formed as a transparent protective layer, preferably as a transparent protective lacquer or as a see-through film. In this case it is possible that the part of the multilayer body that is formed as the transfer layer otherwise does not have any further decorative layers, particularly no further colored, opaque, translucent or transparent decorative layers. In this case it is also possible that a body to be decorated, particularly a substrate, already has an existing decoration and the at least one decorative layer that bonds as part of the transfer layer to the body to be decorated complements the existing decoration of the body to be decorated only by a surface relief, i.e. provides an additional, haptic decoration. In this case, the multilayer body provides a transparent haptic film for producing a plastic article decorated therewith and having a surface relief.

The decoration already existing on the body to be decorated may be an inherent color of the body to be decorated, for example a color of the material of which the body to be decorated consists. It is likewise possible that the decoration already existing on the body to be decorated is already applied before the application of the at least one decorative layer, as a liquid or powdered material in the form of a layer, as a conventional transfer film or as a laminating film on the body to be decorated.

It is possible that the decorative effect is produced by one or more at least partially arranged, possibly mirror-reflective, metal layer(s) and/or an at least partially arranged interference layer and/or an at least partially arranged replicating layer with relief structures, such as macroscopic relief structures, diffractive structures or holograms, and/or an at least partially arranged color layer and/or an at least partially arranged pigmented layer, which comprises fluorescent, phosphorescent, thermochromic or photochromic pigments or pigments with viewing-angle-dependent color-changing effects. A protective layer may be a transparent or translucent or opaque lacquer layer, preferably very resistant to external mechanical and/or chemical influences, with or without coloration. It is possible that the structural layer is arranged in register with at least one decoration of at least one of the at least one decorative layer(s). A decoration should be understood as meaning any structure producing a decorative effect or any layer structure producing a decorative effect. Register should be understood as meaning the positionally exact arrangement of layers lying one over the other. Maintaining the register of the layers is preferably checked on the basis of registration marks, which are present in the same manner on all the layers and from which it can be easily seen whether the layers are arranged in register. The register accuracy is given in both dimensions, i.e. length and width.

It is possible that a release layer with a thickness in the range from 0.01 µm to 0.5 µm, preferably in the range from 0.05 µm to 0.1 µm, is arranged between the structural layer and the at least one decorative layer.

The IM and IML processes are combined processes comprising hot stamping, vacuum forming and molding, in particular injection molding. Insert molding, as opposed to the IMD process, offers the possibility of deforming the film to a greater degree. This is of advantage if, for example, highly profiled and formed parts are required. Firstly, a hot stamping film, comprising a carrier and a vacuum-formable, thin transfer layer arranged thereupon, is hot-stamped onto a carrier film, for example an ABS film, preferably with a thickness of approximately between 200 µm and 750 µm. Generally, after that the carrier of the hot stamping film is pulled off from a film assembly comprising the transfer layer and the carrier film. The film assembly is vacuum-formed under heat. The layers of the film assembly that are vacuum-formed in such a way, comprising the transfer layer and the carrier film, form the so-called "insert" and are cut or punched out to the exact contour. The insert (also known as an "insert sheet") is positioned in an injection mold, the mold is filled with plastic, i.e. the insert undergoes insert molding, then the decorated injection-molded article is removed from the injection mold. As an alternative to the process described above, it is also possible that, after the hot stamping, the carrier of the hot stamping film is left on the film assembly comprising the transfer layer and the carrier film and an IM insert or IM label is formed from an extended film assembly comprising the carrier of the hot stamping film, the transfer layer of the hot stamping film and the carrier film. It is possible that the multilayer film according to the invention is formed by such an insert or label, comprising the carrier of the hot stamping film, the transfer layer of the hot stamping film and the carrier film. Particularly in this case it is possible that the multilayer film comprises a third carrier film, which is preferably formed by the carrier of the hot stamping film and which is arranged between the structural layer and the at least one decorative layer. A multilayer body having such a multilayer film should preferably be used in the case of an IM or IML process. It has proven successful if the third carrier film is a polyester film, in particular a thermoformable PET film.

One advantage of the multilayer body comprising a third carrier film is that the third carrier film protects a possibly surface-examined decorative layer, for example a protective lacquer layer, from adhesive remains, which may originate from the adhesive layer of the relief film. It has proven successful if there is no release layer between the uppermost decorative layer, i.e. the decorative layer lying nearest the relief film, and the third carrier layer, but instead adhesive forces act. If the multilayer film is formed by an insert or label from which the carrier of the hot stamping film has been removed, i.e. if the third carrier layer is absent, and the uppermost decorative layer comes directly into contact with an adhesive layer, remains of adhesive on the uppermost decorative layer of the plastic article after the film assembly comprising the relief film has been pulled off from the decorated plastic article cannot be ruled out.

It is possible that a release layer is arranged between the third carrier film and the at least one decorative layer.

It is possible that the relief film is laminated onto the multilayer film. The lamination takes place in a preferred way by rolling a heated roller on the relief film or in a lifting process by means of a heated punch which contacts the relief film. It is possible if the relief film, formed as a first single laminate, and the multilayer film, formed as a second single laminate, are united into one laminate by means of thermal lamination, the laminating rate being variable in the range from 2 m/min to 10 m/min, preferably in the range from 3 to 5 m/min. Depending on the adhesive that is used, the two single laminates may be laminated together at a temperature in the range from 90 to 150° C., preferably at a temperature of about 120° C. In this case, the pressing pressure lies in the range from 70 to 90 bar, preferably at about 80 bar.

It is possible that, if the structural layer of the multilayer body comprises a radiation-curable lacquer which is cured, and the at least one decorative layer comprises a radiation-curable lacquer which is not cured, the process for producing a multilayer body further comprises a curing of the structural layer, which is carried out before step c).

In the process for producing the decorated injection-molded article, step B) preferably comprises the following steps: injecting the plastics injection-molding compound into the injection mold such that the plastics injection-molding compound comes into contact with a side of the multilayer body that is facing away from the inner wall of the injection mold; setting the pressure of the injected plastics injection-molding compound such that the multilayer film is pressed against the relief film in the direction of the inner wall of the injection mold; and maintaining the pressure of the injected plastics injection-molding compound until a relief of the structural layer is stamped to a predetermined stamping depth in one or more of the at least one decorative layer(s). The structural layer substantially withstands the injection pressure and injection temperatures, so that the structural layer does not experience any deformation, or only very slight deformation, as a result of the pressure and the temperature of the injected plastics injection-molding compound and acts as a spacer between the inner wall of the injection mold and the multilayer film. The multilayer film is deformed in the direction of the inner wall of the injection mold to a greater extent in the depressed regions of the structural layer than in the elevated regions of the structural layer. As a result of this deformation, the relief of the structural layer is stamped into the multilayer film, and consequently also into one or more of the at least one decorative layer(s).

In a process for producing the decorated injection-molded article, in particular in an IMD process, using a multilayer body formed as a transfer film of which the multilayer film has, adjoining the structural layer in the following sequence, the second carrier film, a release layer and the at least one decorative layer, it has proven successful if the film body which is pulled off comprises the relief film, the second carrier film and the release layer.

In a process for producing the decorated injection-molded article, in particular in an IM or IML process, using a multilayer body of which the multilayer film has, adjoining the structural layer in the following sequence, the at least one decorative layer and the second carrier film, it has proven successful if the film body is pulled off from the plastics material, the at least one decorative layer firmly bonded thereto and the second carrier film firmly bonded thereto, with the plastics material, the at least one decorative layer firmly bonded thereto and the second carrier film firmly bonded thereto providing the decorated injection-molded article having a surface relief. In this case it is preferred if the film body which is pulled off consists of the relief film or the relief film and an adhesive layer of the multilayer film.

In a process for producing the decorated injection-molded article, in particular in an IM or IML process, using a multilayer body of which the multilayer film comprises a third carrier film, which is arranged between the structural layer and the at least one decorative layer, it has proven successful if the film body which is pulled off comprises the relief film and the third carrier film and the film body is pulled off from the plastics material, the at least one decorative layer firmly bonded thereto and the second carrier film firmly bonded thereto, with the plastics material, the at least one decorative layer firmly bonded thereto and the second carrier film firmly bonded thereto providing the decorated injection-molded article having a surface relief.

It is possible that the process for producing a decorated injection-molded article having a surface relief also comprises the following steps, which are carried out before step a): forming the multilayer body into a desired form by applying heat and pressure, particularly by thermoforming; and trimming the formed multilayer body along a defined contour line, for example by means of punching or laser cutting.

In the process for producing a decorated plastic article having a surface relief by means of hot stamping, step β) preferably comprises the following steps: applying pressure to the multilayer body and/or the substrate such that the relief film and the substrate are pressed against one another; and setting and maintaining the pressure until a relief of the sstructural layer is stamped to a predetermined stamping depth in one or more of the at least one decorative layer(s). The structural layer substantially withstands the hot stamping pressure and the hot stamping temperatures, so that the structural layer does not experience any deformation, or only very slight deformation, as a result of the pressure and the temperature of the hot stamping process and acts as a spacer between the first carrier film and the multilayer film. The multilayer film is deformed in the direction of the first carrier film to a greater extent in the depressed regions of the structural layer than in the elevated regions of the structural layer. As a result of this deformation, the relief of the structural layer is stamped into the multilayer film, and consequently also into one or more of the at least one decorative layer(s). In the process for producing a decorated plastic article having a surface relief by means of hot stamping, the hot stamping preferably takes place by rolling heated rollers on the multilayer body or in a lifting process by means of heated area- or form-imparting punches. As a result, pressure is applied to the multilayer body and/or the substrate such that the relief film and the substrate are pressed against one another.

In the case of the process for producing a decorated plastic article having a surface relief by means of hot stamping, it has proven successful if the plastic body is formed as a film web.

If the plastic article used in the hot stamping forms a film web, it has proven successful if the film web decorated with the at least one decorative layer is further processed by means of thermoforming or punching into a semifinished product. The semifinished product may finally be placed in an injection mold and have a plastics injection-molding compound injected onto at least one of its two sides. Such a process is usually referred to as an insert-molding process.

It has generally proven successful if at least the surface relief that is produced in the processes according to the invention for producing a decorated plastic article having a surface relief is overmolded in a subsequent injection-molding process with a plastics injection-molding compound, particularly a transparent, preferably high-gloss plastics injection-molding compound, so that special optical depth effects are obtained. After that, however, the surface of the plastic article no longer has a feelable surface relief.

BRIEF DESCRIPTION OF THE DRAWINGS

FIGS. 1 to 10 are intended to explain the invention by way of example. Thus, schematically and not to scale:

FIG. 1 shows a process for producing a multilayer body,

FIG. 7 shows a process step for producing a further decorated plastic article having a surface relief similar to the process step represented in FIG. 3a, FIG. 8 shows a process step for producing a further decorated plastic article having a surface relief similar to the process step represented in FIG. 4a, FIG. 9 shows a process step for producing a further decorated plastic article having a surface relief, and FIG. 10 shows a section of a surface of a decorated plastic article having a surface relief.

DETAILED DESCRIPTION OF THE INVENTION

Figure 1:
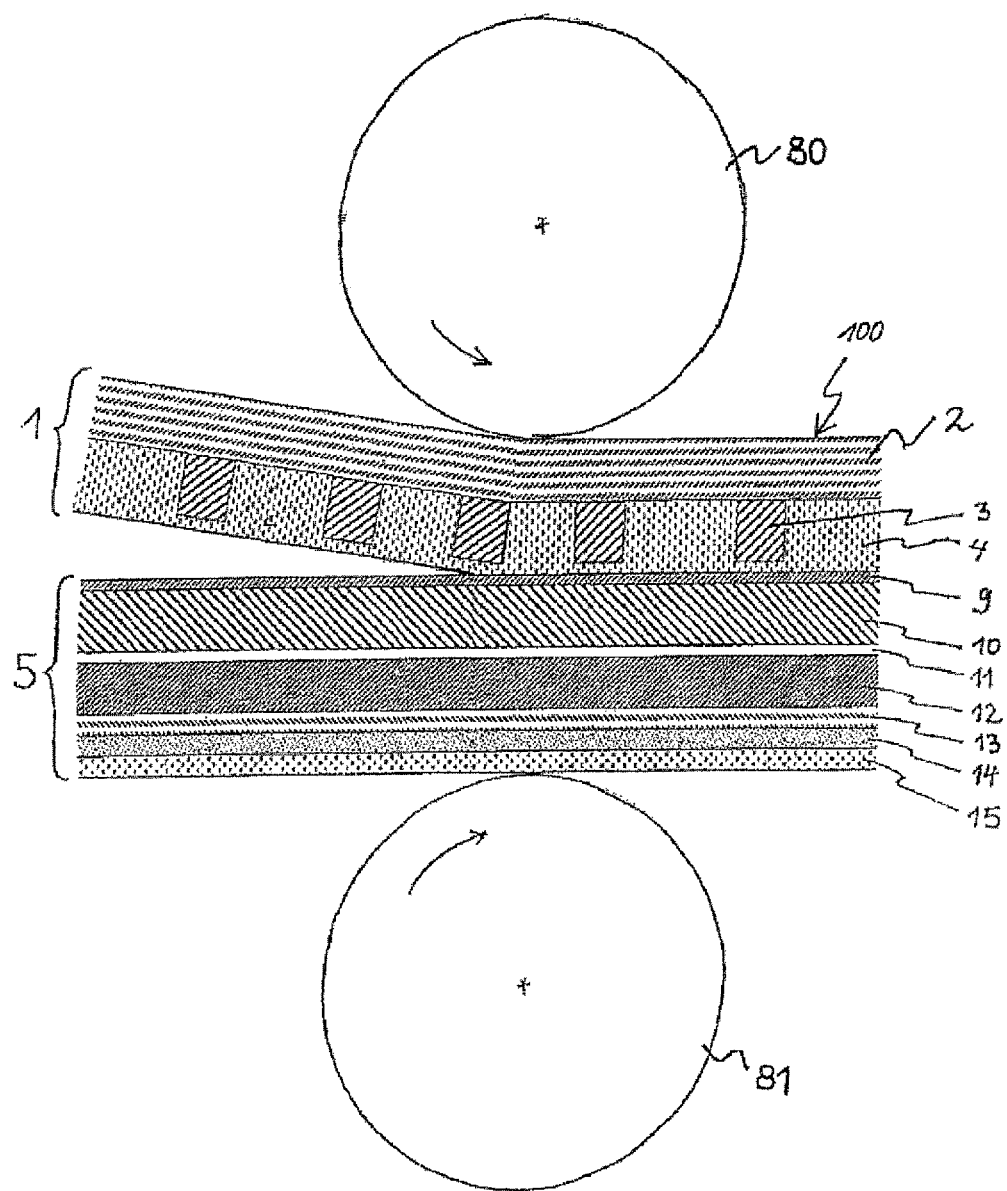

FIG. 1 shows a process for producing a multilayer body 100. Provided for this is a relief film 1, which has a first carrier film 2 and a structural layer 3 arranged on one side of the first carrier film 2. In the present exemplary embodiment, the structural layer 3 is formed as a lacquer layer printed onto the first carrier film 2 by means of screen printing. Therefore, the first carrier film 2 has a region that is covered by the structural layer 3 and a largely uncovered region; the structural layer 3 is therefore formed in specific regions, i.e. partially. Furthermore, the relief film 1 has an adhesive layer 4, which has been applied to the partially arranged structural layer 3 and which covers the structural layer 3 on its side facing away from the carrier film 2. The first carrier film 2 of the relief film 1 has a thickness in the range from 12 to 50 µm, preferably in the range from 16 to 23 µm. In this figure, as in the other figures, the devices represented are not shown to scale.

The first carrier film 2 is a PET film. The structural layer 3, which is partially arranged on the first carrier film 2, has a layer thickness in the range from 5 to 250 µm, preferably in the range from 10 to 70 µm. The structural layer 3 is produced from a UV-curable lacquer. Before the relief film 1 and the multilayer film 5 are laminated together, the structural layer 3 of the relief film 1 is cured. After the curing, the UV lacquer has a high degree of hardness. In the embodiment shown in FIG. 1, the adhesive layer 4 of the relief film 1 has been applied in a layer thickness which is greater than the structure depth of the structural layer 3. In this way, the structural layer 3 is completely covered by the adhesive layer 4. The very hard structures of the structural layer 3 are capable of pressing through the adhesive layer 4, which in comparison with them is very much softer.

The multilayer film 5 is formed as a customary IMD-ing transfer film. The transfer film 5 has an adhesive layer 9, a second carrier film 10, a release layer 11, a first decorative layer 12, formed as a transparent protective lacquer layer, an intermediate layer 13, a second decorative layer 14, formed as a decorative layer assembly, and a primer layer 15. The release layer 11, the protective lacquer layer 12, the intermediate layer 13, the decorative layer 14 and the primer layer 15 may have been applied to the second carrier film 10 by means of a printing or molding process.

The adhesive layer 9 of the multilayer film 5 has a layer thickness of 0.5 to 2 µm. The second carrier film 10 of the multilayer film 5 is a polyester film with a layer thickness in the range from 16 to 23 µm. The release layer 11 has a layer thickness in the range from 0.2 to 0.5 µm. The protective lacquer layer 12 is formed as a pre-cured chemically and/or physically crosslinked lacquer system. After a pre-curing/drying of the protective lacquer layer 12 during the production of the multilayer film 5, a later final curing of the protective lacquer layer 12 takes place on the finished-decorated plastic article. Both drying and curing steps may be thermally and/or radiation-based. The protective lacquer layer 12 has a layer thickness in the range from 5 to 10 µm. The intermediate layer 13 is formed as an intermediate lacquer layer, with a layer thickness in the range from 0.8 to 1.2 µm. The decorative layer 14 comprises three decorative lacquer layers, each decorative lacquer layer having a layer thickness in the range from 0.8 to 1.2 µm. The entire decorative layer assembly 14 is therefore at most 3.6 µm thick. The primer layer 15 is a primer which improves bonding of the multilayer film 5 to a plastics material injected during insert molding and has a layer thickness in the range from 0.8 to 1.5 µm.

The relief film 1 and the multilayer film 5 are provided and are united into a multilayer body 100 by means of thermal lamination, the laminating rate being between 3 and 5 m per minute. For laminating, the relief film 1 is oriented such that the first carrier film is facing away from the multilayer film 5 and the structural layer 3 is facing toward the multilayer film 5. A pair of rollers 80, 81 laminates the two layer assemblies 1, 5 together into a multilayer body 100 by applying pressure and temperature. In this case, the roller 80 lying against the relief film 1 is formed as a preferably warm stamping roller or heated roller and the roller 81 lying against the primer layer 15 of the multilayer film 5 is formed as a preferably cold backing roller. The pressure and temperature prevailing during the lamination depend on the type of adhesive layers 4, 9 that are used. Preferably, the lamination of the two films 1, 5 takes place at a temperature of about 120° C. and a pressing pressure of about 80 bar.

Figure 2A:
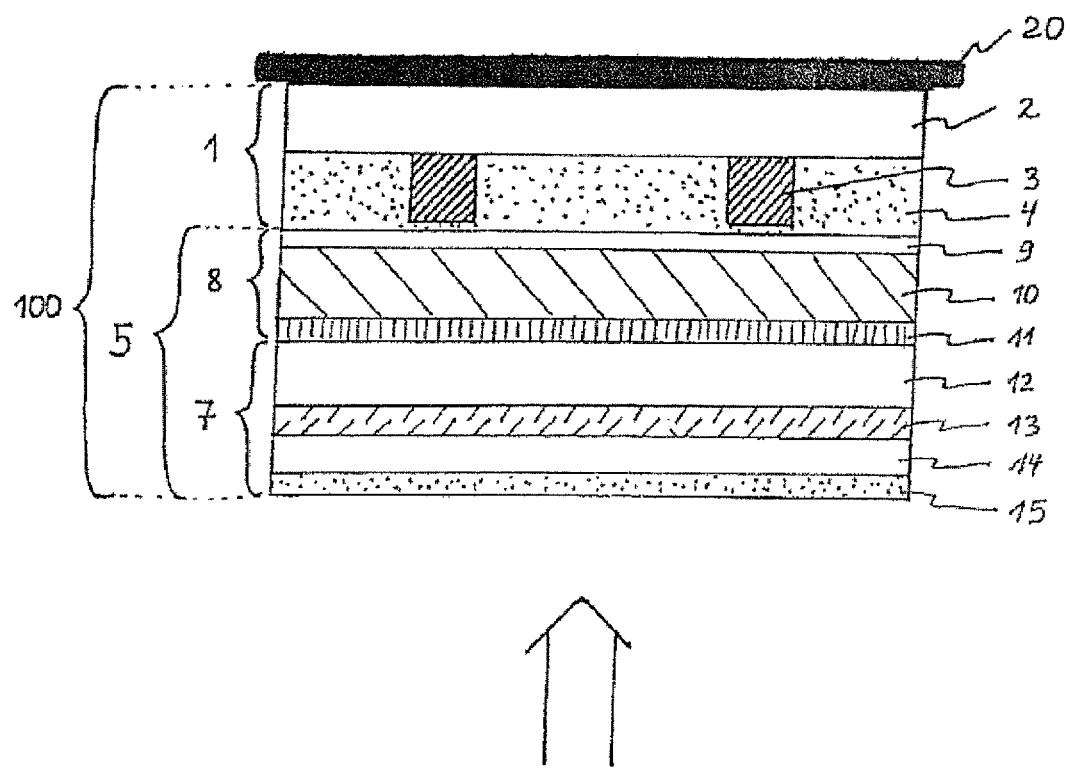
FIGS. 2a to 2c show process steps for producing a first decorated plastic article having a surface relief.
Figure 2A:
Figure 2B:
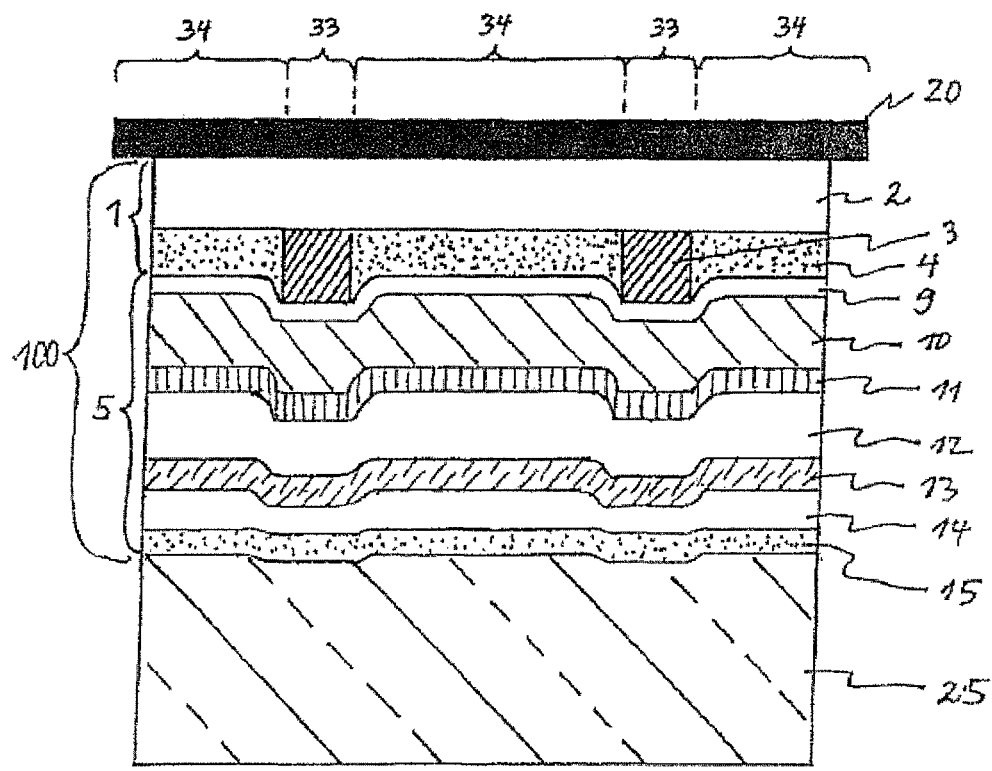
Figure 2C:
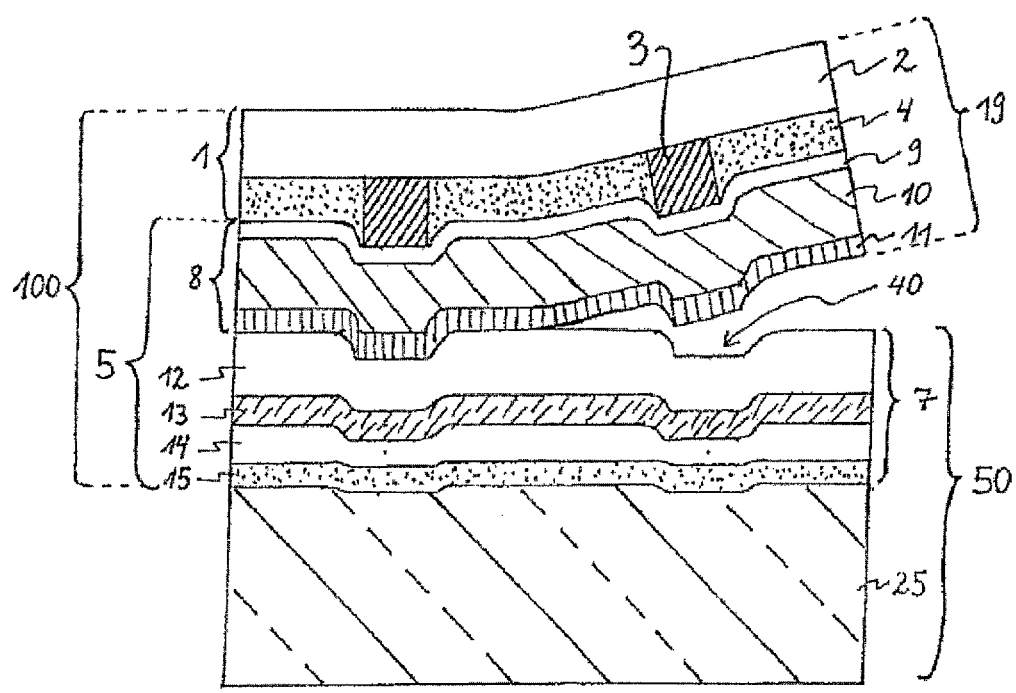

FIGS. 2a to 2c illustrate three steps for producing a first decorated plastic article having a surface relief in an IMD process, by using the multilayer body 100 shown in FIG. 1.

FIG. 2a shows an arranging step in which the multilayer body 100 produced by the laminating process represented in FIG. 1 is arranged in an injection mold 20. The multilayer body 100 comprises a decorative transfer film 5, consisting of a layer system 8 and a transfer layer 7, and comprises a relief film 1 laminated thereupon. The layer system 8 comprises the adhesive layer 9, the second carrier film 10 and the release layer 11. The transfer layer 7 comprises the protective lacquer layer 12, the intermediate layer 13, the decorative layer 14 and the primer layer 15. After the multilayer body 100 has been applied to a base body to be decorated, the layer system 8 is pulled off from the transfer layer 7. This takes place at a point in time when the primer layer 15 is already firmly bonded mechanically to the base body. FIG. 2a schematically shows how the multilayer body 100 is used in an IMD process. A detail from the injection mold 20 to the rigid inner wall of which the multilayer film 100 is applied is schematically represented, the first carrier film 2 of the relief film 1 lying directly against the inner wall of the injection mold 20. After closing of the injection mold 20, a plastics injection-molding compound, symbolized by the arrow depicted, is injected into the injection mold 20 and the injection mold 20 is filled with it. The multilayer body 100 is thereby pressed against the injection mold 20.

FIG. 2b shows an injection-molding step in which the multilayer body 100 arranged in the injection mold 20 undergoes insert molding with a plastics injection-molding compound 25. In FIG. 2b it can be seen that the plastics injection-molding compound 25 presses the multilayer body 100 against the injection mold 20 in such a way that the multilayer film 5 is pressed in the direction of the injection mold 20 in the regions 34 in which the first carrier film 2 has no structural elements or in which the structural layer 3 has depressions. In the regions 33 in which the first carrier film 2 is provided with the structural layer 3, on the other hand, the multilayer film 5 remains substantially in its position. Since the structural layer 3 substantially withstands the injection pressure and the injection temperatures, the structural layer 3 acts as a spacer between the rigid inner wall of the injection mold 20 and the multilayer film 5, which means that the structural layer 3 does not experience any deformation, or only very slight deformation. Depending on the forming of the structural layer 3, the multilayer film 5 has a planar shape in the regions 33 with structural layer 3 and a shape protruding toward the relief film 1 in the regions 34 without structural layer 3. In the present case, in which the structural layer 3 consists of individual lacquer regions applied by means of screen printing, protuberances are obtained, as represented in FIG. 2b, the exact form of which is dependent on a series of parameters, including the stamping pressure, the extensibility of the multilayer film 5 and the compressibility of the adhesive layer 4. The thinner the adhesive layer 4 is applied, the more accurately the protuberances in the multilayer film 5 can correspond to the elevated regions 33 of the structural layer 3, i.e. the more exactly an impression of the relief is formed in the multilayer film 5.

It is possible that, in the case of a structural layer 3 with a smaller structure depth, and possibly a smaller layer thickness of the adhesive layer 4, than in the case of the example represented in FIG. 2b, the protuberances reach the bottom of the depressed regions 34, and therefore a predetermined structuring element of the multilayer film 5 that is arranged there also stamps on a pattern, which is defined by the predetermined structuring element, in the regions 34.

The structural layer 3 acts with respect to the multilayer film 5 as a fixed stamping punch, against which a deformable material, i.e. the multilayer film 5, is pressed. In this way, the structural layer 3 stamps through the adhesive layer 9, the second carrier film 10 and the release layer 11 a surface relief, which represents a negative of the relief structure of the structural layer 3, into the protective lacquer layer 12 and into the decorative layer 14. After curing of the plastics injection-molding compound to form a plastics material 25 or after cooling of the plastics injection-molding compound, the injection mold 20 is opened and the plastics material 25 bonded to the multilayer body 100 is removed.

FIG. 2c shows a pulling-off step, in which a film body 19 is pulled off from the transfer layer 7, which is firmly bonded to the plastics material 25. The film body consists of the layer system 8 and the relief film 1. The injection-molded article 50 provided by the pulling-off step and decorated with the transfer layer 7 formed as a decorative element has a three-dimensional structuring 40 in the region of the decorative element 7, the three-dimensional structuring 40 being formed such that elevations are formed in the regions 34, in which no structural layer 3 was present or in which the structural layer 3 has depressions, and troughs or planes are formed in the regions 33, in which the structural layer 3 was arranged. After the pulling-off step, a final curing of the UV-curable protective lacquer layer 12 takes place on the finished-decorated plastic article 50, for example by UV radiation of a high-pressure mercury vapor lamp.

When using a second carrier film 10 of PET, with a thickness of 16 to 23 µm, an adhesive layer 9 comprising a pressure-sensitive or contact adhesive, with a thickness of 1 µm, a release layer 11, with a thickness in the range of 0.1 µm, and a structural layer 3, with a structure depth of about 20 µm, the profile depth of the three-dimensional structuring 40 produced in the protective lacquer layer 12 of the decorated injection-molded article 50 is about 15-20 µm. The maximum printing resolution limits the resolution of the process. With a thickness of the second carrier film 10 of about 20 µm, a structural layer 3 produced by the screen-printing process with a structure depth of about 20 µm and a structure spacing of about 1 mm and a desired depth of the three-dimensional structuring 40 of approximately 15 to 20 µm, a minimum line width of approximately 500 µm can be set. The spacing between two three-dimensional structures 40 in finished-decorated plastic articles should likewise be of this order of magnitude or greater. When using a thinner second carrier film 10, this value can be reduced further.

In FIGS. 2b and 2c, the protuberances in the multilayer film 5 are reduced in their structure depth compared to the structure depth of the structural layer 3, this reduction being dependent on various parameters, as already mentioned above. It is advantageous in this respect if the structure depth of the protuberances in the multilayer film 5 is reduced only slightly compared to the structure depth of the structural layer 3, or deviates only slightly therefrom, so that an impression of the structure depth of the structural layer 3 is formed as exactly as possible in the multilayer film 5 as protuberances that are, as far as possible, just as deep.

Figure 3A:
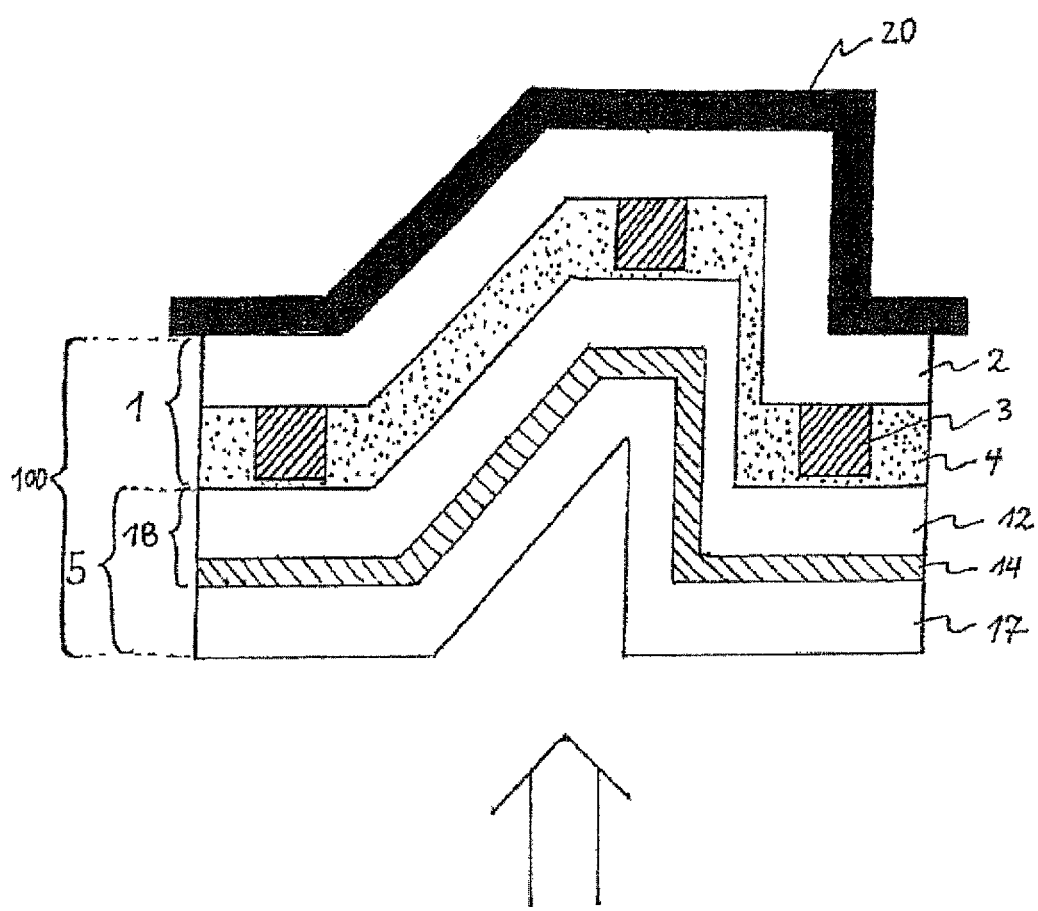
FIGS. 3a to 3c show process steps for producing a second decorated plastic article having a surface relief.
Figure 3B:
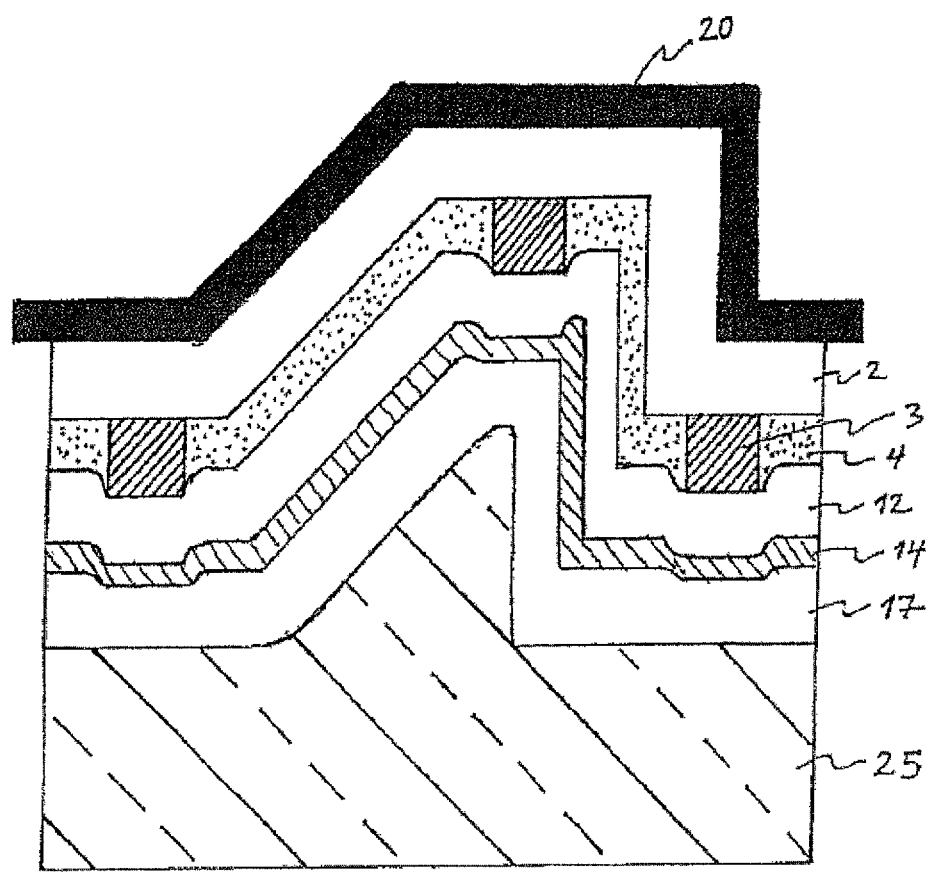
Figure 3C:
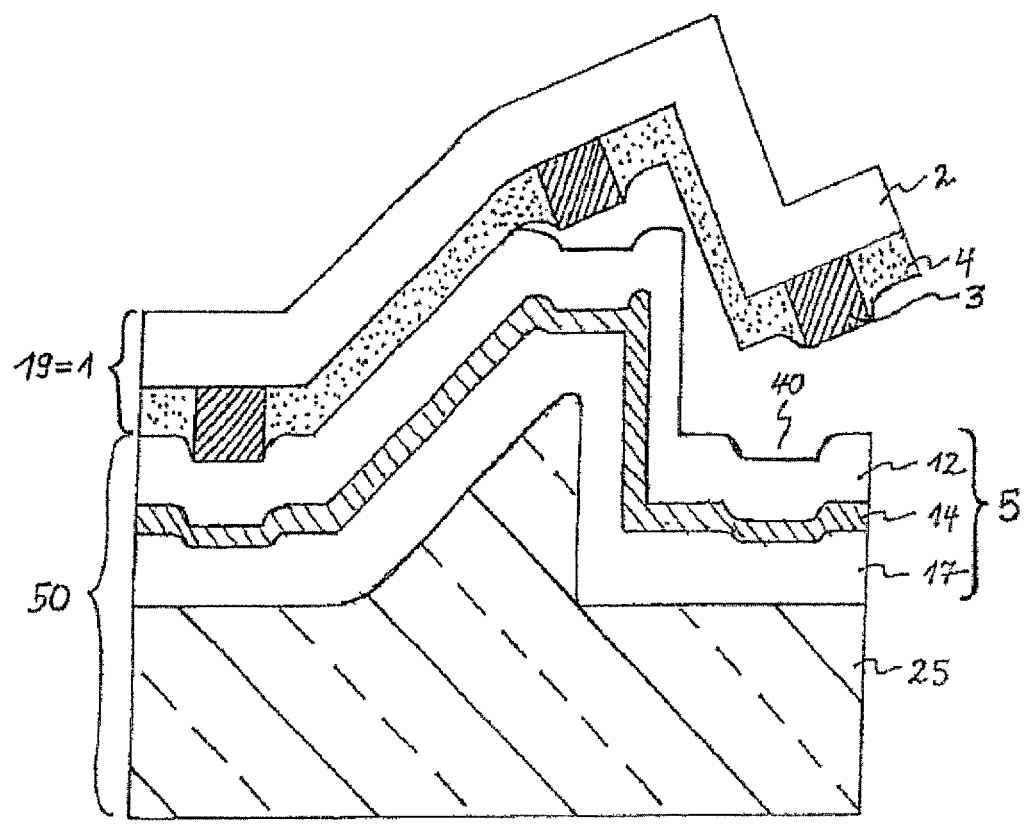

FIGS. 3a to 3c illustrate three steps for producing a second decorated plastic article having a surface relief, in an IM or IML process.

FIG. 3a shows an arranging step, in which an IM-ing, pre-formed multilayer body 100 is arranged in an injection mold 20. The multilayer body 100 consists of a relief film 1 and a multilayer film 5. The relief film 1 corresponds to the relief film that was explained in the exemplary embodiment described with reference to FIGS. 2a to 2c. The structural layer 3 is produced from a UV-curable lacquer.

The multilayer film 5 is formed as an insert sheet, consisting of a second carrier film 17, in particular an ABS film ("ABS sheet"), and a stamping film 18 arranged on the second carrier film 17. The stamping film 18 consists of a UV-curable protective lacquer layer 12 and a decorative layer 14, the decorative layer 14 being arranged between the protective lacquer layer 12 and the second carrier film 17. The production of the insert sheet 5 takes place by hot stamping the stamping film 18 onto the second carrier film 17. For this purpose, a transfer film, comprising a carrier film and the stamping film 18 formed as a transfer layer, is laminated together with the ABS film 17, so that the stamping film 18 comes to lie directly on the ABS film 17. After that, the carrier film is pulled off from the transfer film, whereby the ABS film 17 with the stamping film 18 firmly bonded thereto is provided as the multilayer film 5.

The multilayer film 5 formed in this way is laminated together with the relief film 1. Before the relief film 1 and the multilayer film 5 are laminated together, the structural layer 3 of the relief film 1 is cured. After the curing, the UV lacquer has a high degree of hardness. The adhesive layer 4 of the relief film 1 is applied in a layer thickness which is greater than the structure depth of the structural layer 3. In this way, the structural layer 3 is completely covered by the adhesive layer 4. The very hard structures of the structural layer 3 are capable of pressing through the very much softer adhesive layer 4. The adhesive layer 4 may also be applied in a very much smaller layer thickness, which is significantly less than the structure depth of the structural layer 3, for example 1 to 5 µm. The adhesive layer 4 then merely forms a thin layer on the structures of the structural layer 3 and between these structures on the carrier film 2. The protective lacquer layer 12, formed for example from a chemically and/or physically crosslinked lacquer system, is not cured, or only pre-cured, before the laminating together.

If the multilayer film 5 is intended for use in an IM process, as in this exemplary embodiment, it has proven particularly successful if the first carrier film 2 of the relief film 1 is formed as a particularly flexible PET film. For example, a known PET film with a film thickness in the range from 19 to 50 µm, which at least in one direction has a modulus of elasticity in the range from 3500 to 5000 N/mm$^2$, may be used for this.

It is further preferred in this case if an only slightly adhering pressure-sensitive adhesive is used as the adhesive layer 4 for laminating the relief film 1 onto the insert sheet 5. After the lamination of the relief film 1 onto the insert sheet 5, the multilayer body 100 formed in this way is vacuum-formed under heat, the relief film 1 being formed such that it can participate in this vacuum forming without being damaged. The layers vacuum-formed in this way, comprising the carrier film 17, the hot-stamping film and the relief film 1, which form the so-called "insert", are cut or punched out to the exact contour. A detail from an injection mold 20, which has an inner wall of which the surface contour corresponds to the form of the insert 100, is schematically represented. The multilayer film 100 is placed against the rigid inner wall of the injection mold 20, the first carrier film 2 of the relief film 1 lying directly against the inner wall of the injection mold 20. After closing of the injection mold 20, a plastics injection-molding compound, symbolized by the arrow depicted, is injected into the injection mold 20 and the injection mold 20 is filled with it. The multilayer body 100 is thereby pressed against the injection mold 20.

FIG. 3b shows an injection-molding step which substantially corresponds to the injection-molding step described with reference to FIG. 2b, to which reference is made here.

FIG. 3c shows a pulling-off step, in which a film body 19 is pulled off from the multilayer film 5, which is firmly bonded to the plastics material 25. The film body 19 consists of the relief film 1. The injection-molded article 50 provided by the pulling-off step and decorated with the multilayer film 5 formed as a decorative element has a three-dimensional structuring in the region of the decorative element 5, elevations being formed in the regions in which no structural layer 3 was present and troughs or planes being formed in the regions in which the structural layer 3 was arranged. After the pulling-off step, a final curing of the UV-curable protective lacquer layer takes place on the finished-decorated plastic article 50.

In FIGS. 3b and 3c, the protuberances in the multilayer film 5 are reduced in their structure depth compared to the structure depth of the structural layer 3, this reduction being dependent on various parameters, as already mentioned above with respect to FIGS. 2a, 2b and 2c. Here, too, it is advantageous in this respect if the structure depth of the protuberances in the multilayer film 5 is reduced only slightly compared to the structure depth of the structural layer 3, or deviates only slightly therefrom, so that again an impression of the structure depth of the structural layer 3 is formed as exactly as possible in the multilayer film 5 as protuberances that are, as far as possible, just as deep.

Figure 4A:
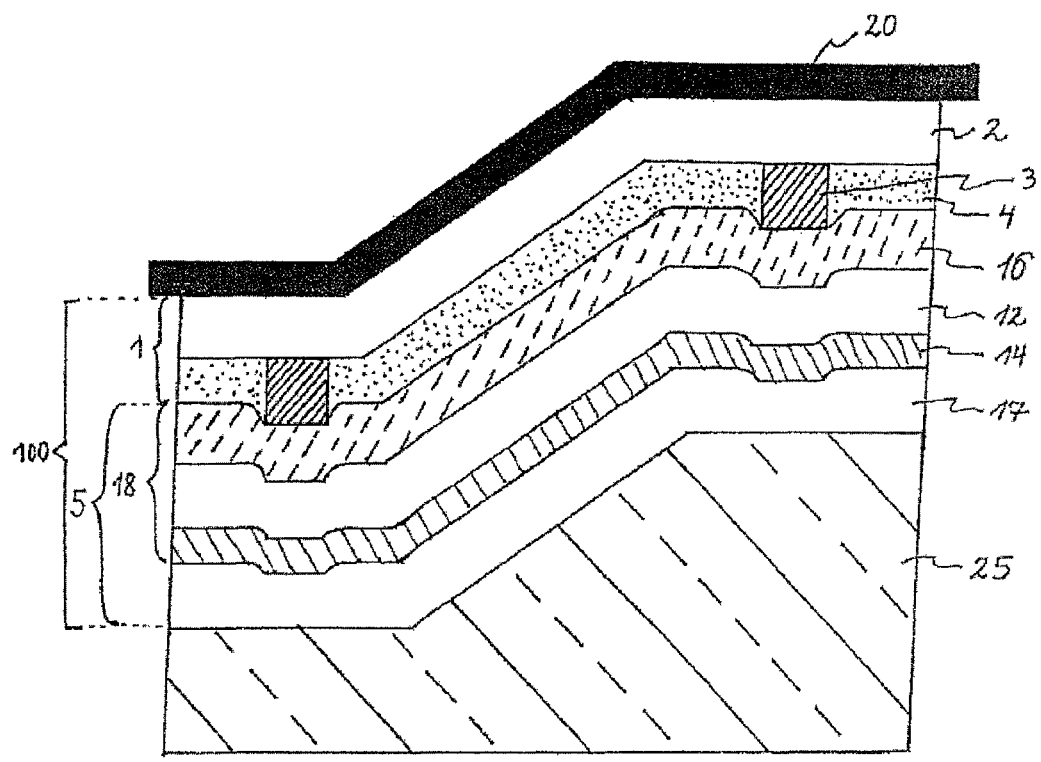
FIGS. 4a to 4b show process steps for producing a further decorated plastic article having a surface relief.
Figure 4B:
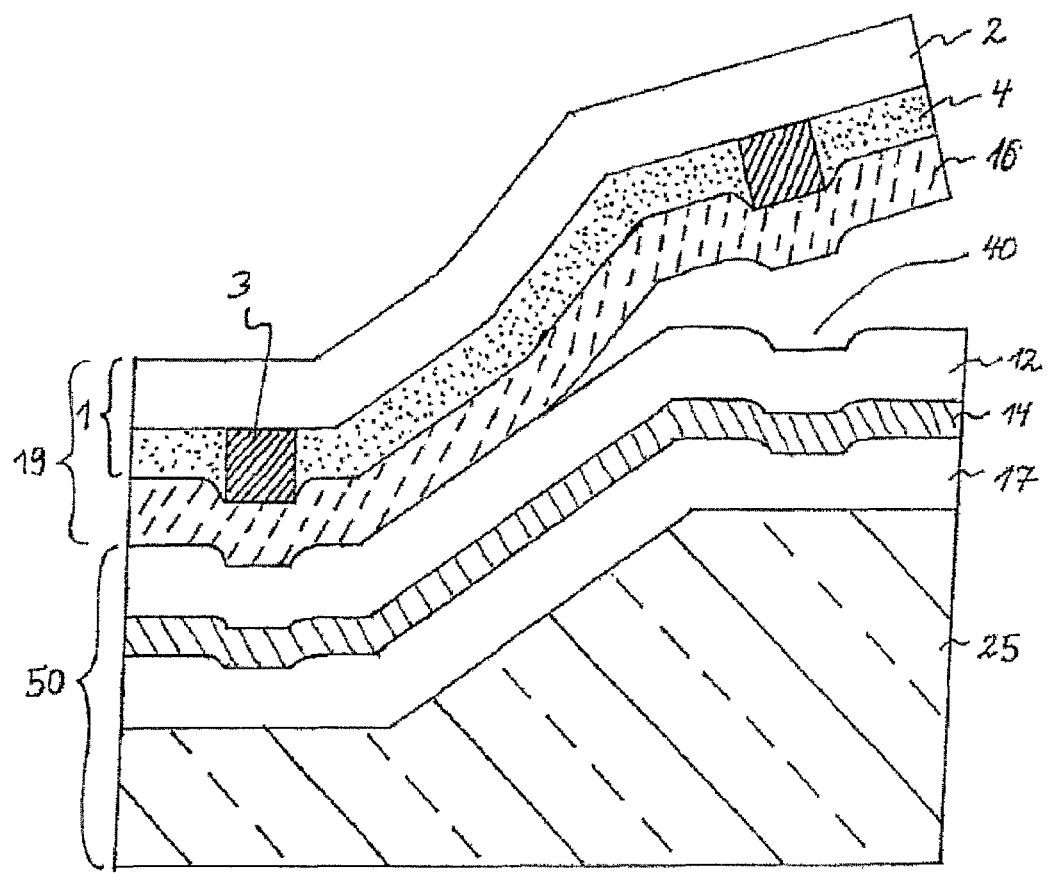

FIGS. 4a and 4b illustrate two steps for producing a further decorated plastic article having a surface relief, in an IN or IML process. The process illustrated in FIGS. 4a and 4b is a variant of the process described in relation to FIGS. 3a to 3c.

FIG. 4a shows a variant of a multilayer body 100 formed as an insert sheet, in which the multilayer film 5 has in addition to the multilayer film 5 shown in FIG. 3a a third carrier film 16, which serves in the process for producing the multilayer film 5 as a carrier film of the hot stamping film 18 and, by contrast with the multilayer film shown in FIG. 3a, has been left on the protective lacquer layer 12 after the hot stamping of the hot stamping film 18 onto the ABS sheet 17.

FIG. 4a shows an injection-molding step which substantially corresponds to the injection-molding step described with reference to FIG. 2b, to which reference is made here. There is no release layer between the protective lacquer layer 12 and the third carrier film 16, formed as a polyester film, but instead the bond between these two layers 12, 16 is based on adhesive forces. By contrast with the exemplary embodiment represented in FIG. 3a, in the case of the variant represented in FIG. 4a the adhesive layer 4 of the relief film 1 is formed as a particularly strongly adhering adhesive. With respect to the other elements, reference is made to the description in relation to FIG. 3a and FIG. 3b.

FIG. 4b shows a pulling-off step, in which a film body 19 is pulled off from a decorative layer, formed by the UV-curable protective lacquer layer 12, the decorative layer 14 and the second carrier film 17, which is firmly bonded to the plastics material 25. The film body 19 consists of the relief film 1 and the third carrier film 16. The injection-molded article 50 provided by the pulling-off step and decorated with the protective lacquer layer 12, the decorative layer 14 and the second carrier film 17 has a three-dimensional structuring 40 in the region of the decorative layer, elevations being formed in the regions in which no structural layer 3 was present and troughs or planes being formed in the regions in which the structural layer 3 was arranged. After the pulling-off step, a final curing of the UV-curable protective lacquer layer 12 takes place on the finished-decorated plastic article 50.

The use of the third carrier film 16 as a release layer between the adhesive layer 4 and the protective lacquer layer 12 makes it possible to avoid adhesive remains on the protective lacquer layer 12, originating from the adhesive layer 4.

In FIGS. 4a and 4b, the protuberances in the multilayer film 5 are reduced in their structure depth compared to the structure depth of the structural layer 3, this reduction being dependent on various parameters, as already mentioned above with respect to FIGS. 2a, 2b and 2c. Here, too, it is advantageous in this respect if the structure depth of the protuberances in the multilayer film 5 is reduced only slightly compared to the structure depth of the structural layer 3, or deviates only slightly therefrom, so that again an impression of the structure depth of the structural layer 3 is formed as exactly as possible in the multilayer film 5 as protuberances that are, as far as possible, just as deep.

Figure 5A:
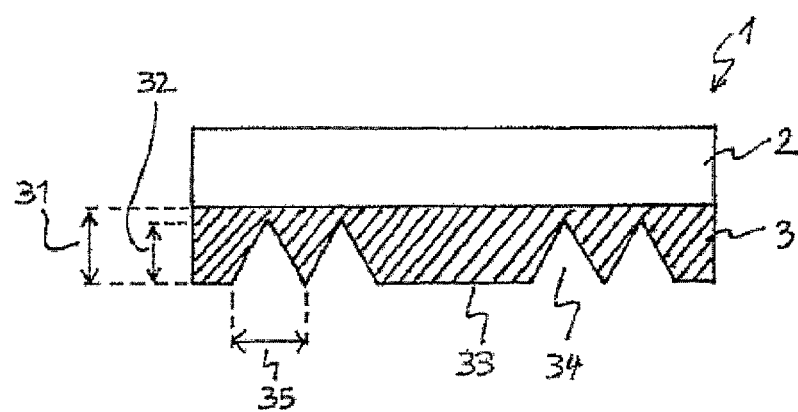
FIGS. 5a and 5b show differently formed structural layers.
Figure 5B:
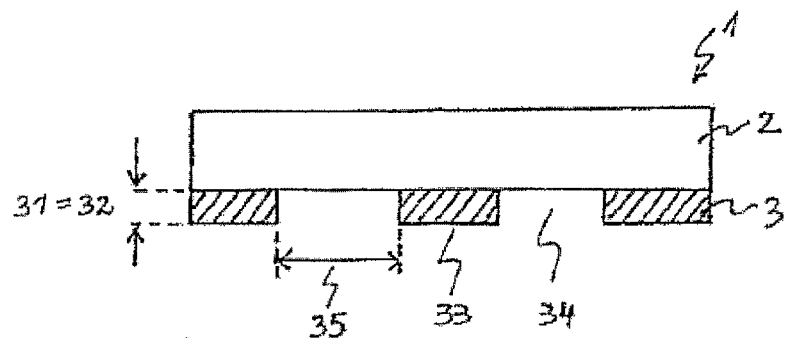

FIGS. 5a and 5b show two different exemplary embodiments of the structural layer 3. In FIGS. 1 to 4b, structural layers 3 that have been applied on the first carrier film 2 by screen printing are represented. The advantage of this type of coating lies in the great structure depth of the structural layer 3 that can be achieved thereby. In this way, deeply stamped-in surface reliefs can be produced.

FIG. 5a shows a relief film 1 with a first carrier film 2 and a structural layer 3, which is formed from a replicating lacquer. To produce this structural layer, a uniform replicating lacquer layer 3 with a layer thickness 31 is applied to the first carrier film 2 and a relief with a structure depth 32 (also referred to as profile depth) is stamped into said layer by means of a stamping tool, for example a replicating roller or a stamping punch. The relief has elevated regions 33 and depressed regions 34. The structure depth 32 is the difference in height between the elevated regions/elevations 33 of the relief or the highest point thereof and the depressed regions/depressions 34 of the relief or the lowest point thereof. If the structure depth 32 is chosen to be less than the layer thickness 31, the bottom of the depressed regions 34 is covered by the replicating lacquer. The spacing 35 between the elevated regions 33 likewise determines the stamped surface relief 40. After curing of the replicating lacquer, the replicating lacquer layer 3 may be coated with an adhesive layer 4.

FIG. 5b shows a relief film 1 with a first carrier film 2 and a structural layer 3, which is formed from a metal layer. To produce this structural layer, the first carrier film is first completely provided with a metal layer on one side. For this purpose, for example, a thin metal film, for example of aluminum or copper, is laminated onto the carrier film. The layer thickness 31 of the metal film is in this case approximately 1 µm to 200 µm. Then the metal layer 3 is removed again in specific regions by means of a conventional demetallizing process, for example by exposure to light and etching, laser ablation, etc. The demetallized regions of the first carrier film 1 form the depressed regions 34 of the relief, the metallized regions of the first carrier film 1 form the elevated regions 33 of the relief. The alternation between the metallized regions 33 and the demetallized regions 34 have the effect that the metal layer 3 forms a relief with a structure depth 31 and a spacing 35 between neighboring metallized regions 33. Since the structure depth 31 is equal to the layer thickness 31, the bottom of the depressed regions 34 is formed by the surface of the first carrier film 2. The structural layer 3 may finally be coated with a preferably thin adhesive layer 4. A structural layer 3 produced in this way may have a very high resolution, combined with a great layer thickness and a high degree of hardness. Particularly by known etching processes or methods of light exposure with positive or negative photoresists, high resolutions and structural accuracies can be achieved. With a structural layer 3 produced in this way, an impression of a surface relief can be formed very accurately in the surface of a plastic article. At the same time, depending on the thickness of the metal layer that is used, an impression of very great structure depths can also be formed with high quality.

Figure 6A:
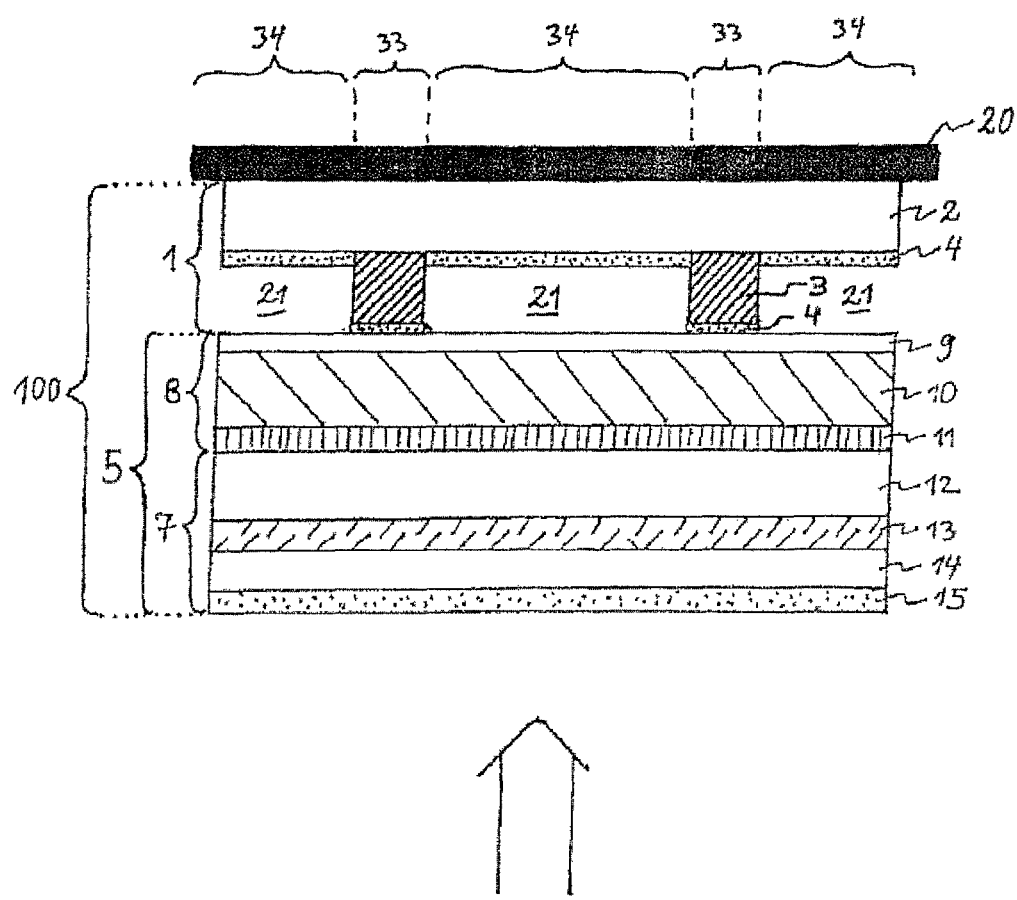
FIGS. 6a to 6c show process steps for producing a further decorated plastic article having a surface relief similar to the process steps represented in FIGS. 2a to 2c.
Figure 6B:
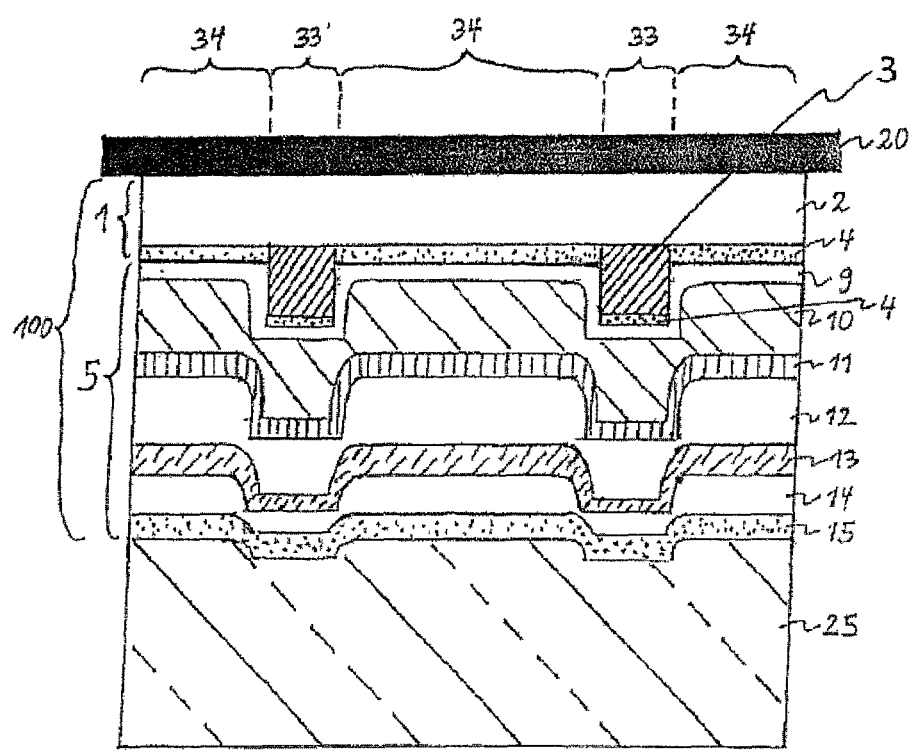
Figure 6C:
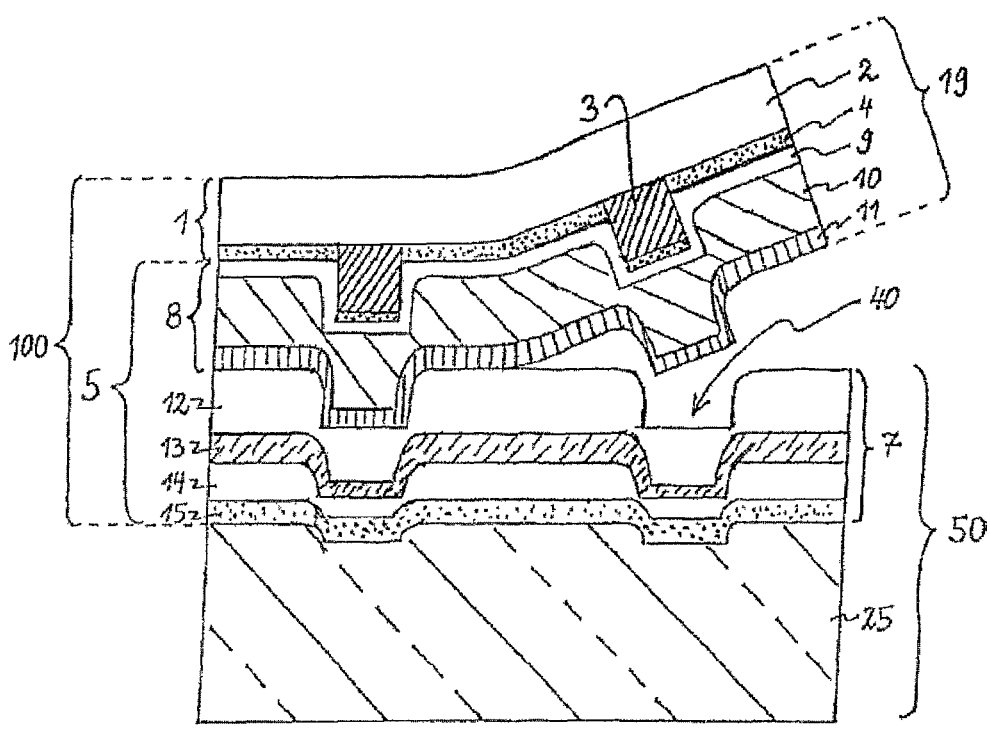

FIGS. 6a to 6c illustrate three steps for producing a further decorated plastic article having a surface relief, in an IMD process. The process steps shown therein are similar to the process steps shown in FIGS. 2a to 2c, but with the difference that the process steps represented in FIGS. 6a to 6c use a multilayer body 100 which has a thin adhesive layer 4, i.e. an adhesive layer 4 of which the thickness is small in comparison with the structure depth of the structural layer 3.

Apart from the configuration of the adhesive layer 4, FIG. 6a corresponds to the representation shown in FIG. 2a, to which reference is therefore made. The adhesive layer 4 is formed as a thin layer which is arranged between and on the structural/relief elements of the structural layer 3. The layer thickness of the adhesive layer 4 is much less than the structure depth of the structural layer 3. For example, the layer thickness of the adhesive layer 4 lies in the range from 1 to 5 µm, while the structure depth of the structural layer 3 lies in the range from 5 to 250 µm.

In the regions 34, in which the structural layer 3 has depressions, between the adhesive layer 4 and the adhesive layer 9 there is a void 21, which may be filled with air. The void 21 may also be evacuated, and contain a vacuum, for example caused by a step of evacuating the injection mold 20 immediately before the injection of the plastics compound and/or by applying suction by means of a vacuum, preferably together with preheating, to the multilayer body 100 to bring it against the inner wall of the injection mold 20 to avoid formation of folds. It is similarly possible that the void 21 is filled with an inert gas, for example $CO_2$ or argon, preferably at low pressure.

FIG. 6b shows an injection-molding step which, apart from the configuration of the adhesive layer 4 and the degree of prominence of the relief in the multilayer body 100, corresponds to the injection-molding step shown in FIG. 2b, to which reference is therefore made. The multilayer film 5 of the multilayer body 100 represented in FIG. 6a is greatly deformed by means of the structural layer 3 during the injection of the plastics injection-molding compound 25 for the insert molding. The small layer thickness of the adhesive layer 4 enables the multilayer film 5 to adapt itself accurately to the form of the relief of the structural layer 5. Therefore, an impression of the relief of the structural layer 5 can be accurately formed in the multilayer film 5 on account of the thin adhesive layer 4. The deformation of the multilayer film 5 into the depressions 34 of the structural layer 3 has the effect that the uppermost layers of the multilayer film 5, particularly the adhesive layer 9 and the carrier film 10, fill the void 21, which is consequently no longer present after the insert molding. The thinner the adhesive layer 4 is applied on the structural layer 3, the more accurately the protuberances in the multilayer film 5 can correspond to the depressions 34 of the structural layer 3, i.e. the more exactly an impression of the relief of the relief film 1 is formed in the multilayer film 5. With an adhesive layer 4 that is as thin as possible, particularly an impression of the structure depth of the structural layer 3 can be formed very exactly in the multilayer film 5, preferably in all the layers of the multilayer film 5, as protuberances that are almost just as deep.

Figure 10:
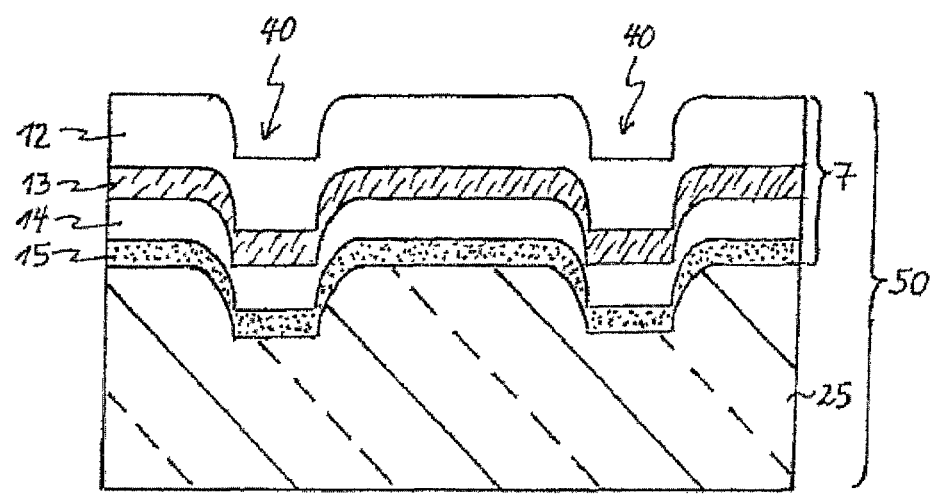

FIG. 6c shows a process step which, apart from the configuration of the adhesive layer 4 and the degree of prominence of the relief in the multilayer body 100, corresponds to the pulling-off step shown in FIG. 2c, to which reference is therefore made. The layer thickness of the adhesive layer 4 is much less than the structure depth of the structural layer 3. On account of the thin adhesive layer 4, an impression of the relief of the structural layer. 5 is formed precisely and deeply into the multilayer film 5. The profile depth of the surface relief 40 present in the injection-molded article 50 is much greater than in the case of the injection-molded article 50 shown in FIG. 2c. It is possible that this profile depth corresponds at least approximately to the structure depth of the structural layer 3. It is also possible that an impression of the surface relief 40 is formed with substantially the same profile depth in all the layers 12-15 of the transfer layer 7, as represented in FIG. 10, and it is not the case, as represented in FIG. 6c, that the profile depth decreases within the transfer layer 7 from a first layer 12, 13, 14 of the transfer layer 7 to a second layer 13, 14, 15 of the transfer layer 7 that is arranged further away in comparison from the relief film 1.

Figure 7:
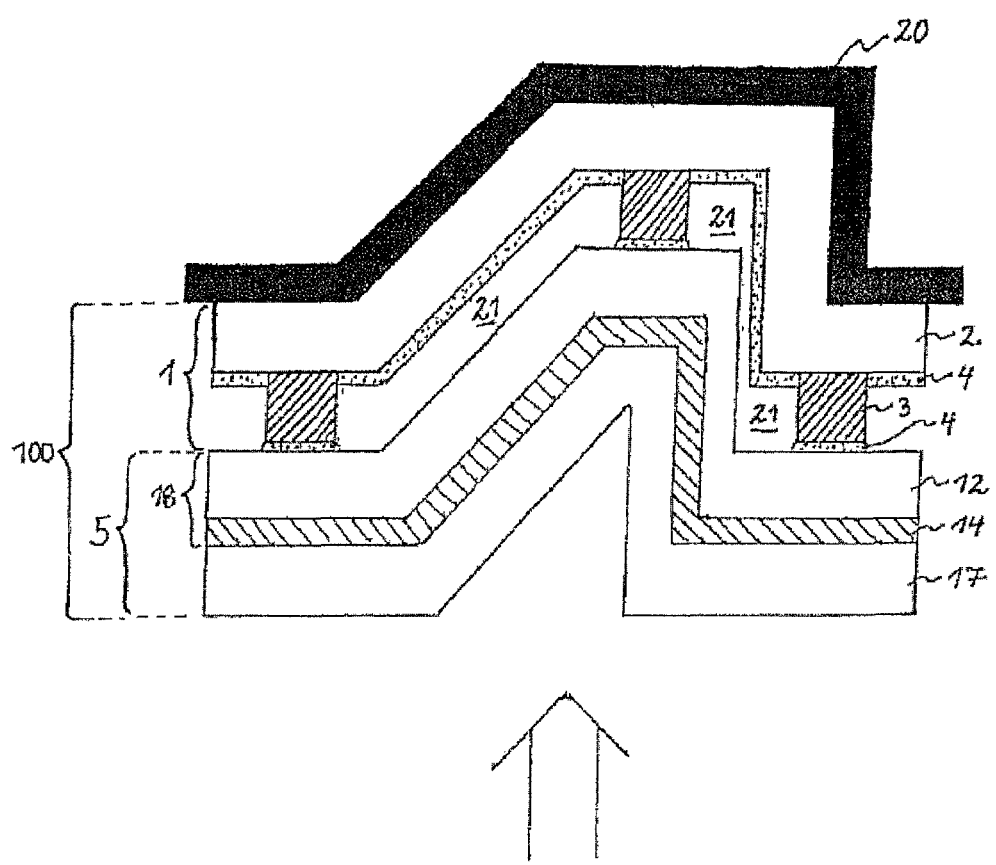

FIG. 7 shows a process step for producing a further decorated plastic article having a surface relief similar to the process step represented in FIG. 3a, to which reference is therefore made, although, by contrast with the process step represented in FIG. 3a, it uses a multilayer body 100 which has a thin adhesive layer 4, i.e. an adhesive layer 4 of which the thickness is small in comparison with the structure depth of the structural layer 3. The adhesive layer 4 is formed as a thin layer which is arranged between and on the structural/relief elements of the structural layer 3. The layer thickness of the adhesive layer 4 is much less than the structure depth of the structural layer 3. For example, the layer thickness of the adhesive layer 4 lies in the range from 1 to 5 µm, while the structure depth of the structural layer 3 lies in the range from 5 to 250 µm. In the regions 34, in which the structural layer 3 has depressions, between the adhesive layer 4 and the adhesive layer 9 there is a void 21, which may be filled with air. As already stated in relation to FIG. 6a, the void 21 may also contain a vacuum or an inert gas. This allows the multilayer film 5 to come into close contact with the relief of the structural layer 3 particularly well and precisely during the insert molding of the multilayer body 100 with plastics injection-molding compound.

Figure 8:
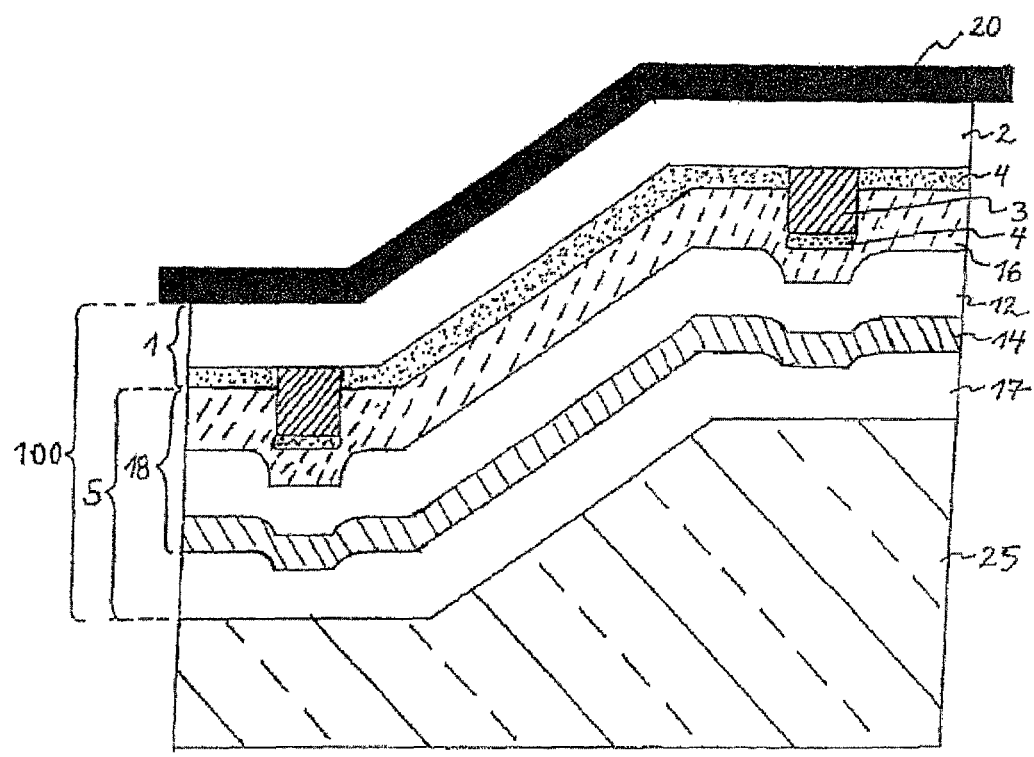

FIG. 8 shows a process step for producing a further decorated plastic article having a surface relief similar to the process step represented in FIG. 4a, to which reference is therefore made, although, by contrast with the process step represented in FIG. 4a, it uses a multilayer body 100 which has a thin adhesive layer 4, i.e. an adhesive layer 4 of which the thickness is small in comparison with the structure depth of the structural layer 3. The adhesive layer 4 is formed as a thin layer which is arranged between and on the structural/relief elements of the structural layer 3. The layer thickness of the adhesive layer 4 is much less than the structure depth of the structural layer 3. For example, the layer thickness of the adhesive layer 4 lies in the range from 1 to 5 µm, while the structure depth of the structural layer 3 lies in the range from 5 to 250 µm. This allows the multilayer film 5 to come into close contact with the relief of the structural layer 3 particularly well and precisely during the insert molding of the multilayer body 100 with the plastics injection-molding compound 25.

Figure 9:
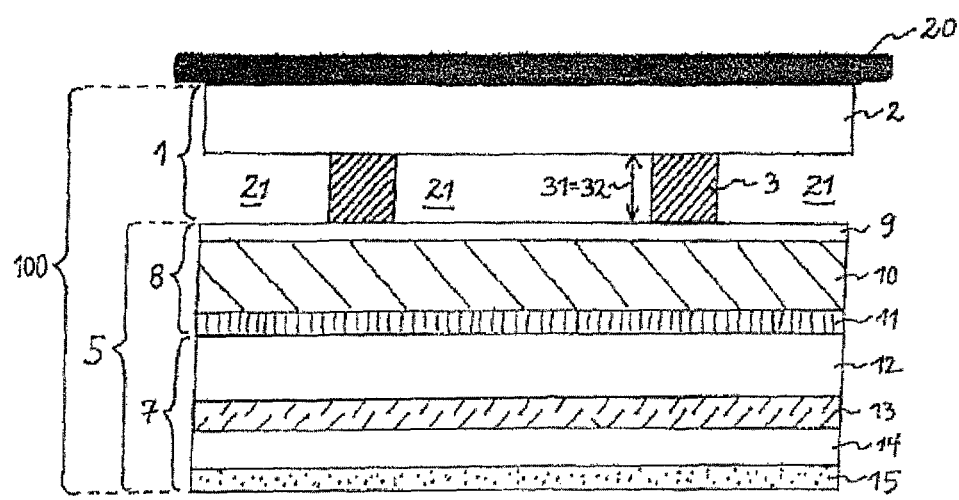
Figure 9:
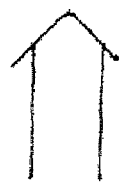

FIG. 9 shows a process step for producing a further decorated plastic article having a surface relief. Apart from the adhesive layer 4 being absent here, FIG. 9 corresponds to the representation shown in FIG. 2a, to which reference is therefore made. This exemplary embodiment dispenses with the arrangement of an adhesive layer 4 between and on the structural/relief elements of the structural layer 3, since the adhesive bond between the relief film 1 and the multilayer film 5 is formed by the adhesive layer 9, which is arranged on the multilayer film 5. Therefore, the relief film 1 merely consists of the carrier film 2 and the structural layer 3 arranged thereupon. Due to the absent adhesive layer 4, the depressions of the structural layer 3 take the form of voids 21, the depth of which corresponds to the layer thickness 31 and the structure depth 32 of the structural layer 3, which makes particularly strong profiling of the surface relief 40 of the injection-molded article 50 possible.

As an alternative to the exemplary embodiment represented in FIG. 9, it may also be envisaged to form the adhesive layer 4 between and on the structural/relief elements of the structural layer 3 and to dispense with the adhesive layer 9 that is arranged on the multilayer film 5. In this alternative case, the transfer film 5 has a second carrier film 10, a release layer 11, a first decorative layer 12, formed as a transparent protective lacquer layer, an intermediate layer 13, a second decorative layer 14, formed as a decorative layer assembly, and a primer layer 15.

FIG. 10 shows a section of a surface of a decorated plastic article 50 having a surface relief 40 provided according to one of the processes according to the invention for producing a decorated plastic article having a surface relief. As already explained in relation to FIGS. 2a to 2c, a multilayer film 5 has been bonded to a plastics material 25 in an injection-molding or hot-stamping step, a structural layer 3 of a relief film 1 stamping a relief into the multilayer film 5. By a suitable choice of the material and process parameters, it is possible that an impression of the relief of the structural layer 3 is formed with substantially the same profile depth in all the layers of the multilayer film 5. After a step of pulling off a film assembly, a transfer layer 7 remains firmly bonded to the plastics material 25, the transfer layer 7 comprising a protective lacquer layer 12, an intermediate layer 13, a decorative layer 14 and a primer layer 15. The injection-molded article 50 thereby provided and decorated with the transfer layer formed as a decorative element has a three-dimensional structure 40 in the region of the decorative element 7, the three-dimensional structure 40 being formed such that an impression of the surface relief 40 is formed with substantially the same profile depth in all the layers 12-15 of the transfer layer 7.

LIST OF DESIGNATIONS 1 relief film
2 carrier film (of 1)
3 structural layer
4 adhesive layer (of 1)
5 multilayer film
7 transfer layer
8 layer system
9 adhesive layer (of 5)
10 carrier film (of 5)
11 release layer
12 decorative layer, first
13 intermediate layer
14 decorative layer, second
15 primer layer
16, 17 carrier film (of 5)
10 18 stamping film
19 film body
20 injection mold
21 void
25 plastics material
31 layer thickness (of 3)
32 structure depth (of 3)
33 elevated region, elevation (of 3)
34 depressed region, depression (of 3)
35 spacing (of 33)
40 surface relief
50 plastic article, injection-molded article
80, 81 roller
100 multilayer body

The invention claimed is:

1. A multilayer body for producing a decorated plastic article having a surface relief, the multilayer body comprising:
 a relief film with a first carrier film, a structural layer arranged on one side of the first carrier film and an adhesive layer completely covering the structural layer, the adhesive layer being softer than the structural layer; and
 a multilayer transfer film laminated to the relief film, the multilayer transfer film comprising a first portion facing the relief film and a second portion on a side of the first portion opposite the relief film, the first portion having a second carrier film facing the relief film and a release layer on a side of the second carrier film opposite the relief film and the second portion having at least one decorative layer, the at least one decorative layer being deformable by the structural layer upon molding of the decorated plastic article,
 wherein the structural layer of the relief film is arranged between the first carrier film of the relief film and the second carrier film of the multilayer transfer film, and
 wherein the structural layer is formed as a stamped structure for deforming the at least one decorative layer during molding of the decorated plastic article, and
 wherein, after molding, the first portion of the multilayer transfer film is separable from the second portion of the multilayer transfer film to form a decorated plastic article having the second portion with a surface relief formed by the structural layer.

2. The multilayer body as claimed in claim 1, wherein the structural layer has depressed regions which are formed as voids and/or comprise a material which is softer than the structures of the structural layer.

3. The multilayer body as claimed in claim 1, wherein the multilayer transfer film does not have any deformation originating from the structural layer.

4. The multilayer body as claimed in claim 1, wherein a layer of the multilayer body which is arranged on a side of the structural layer that is facing away from the first carrier film directly adjacent the structural layer, has a constant layer thickness.

5. The multilayer body as claimed in claim 1, wherein the first carrier film is a polyester film.

6. The multilayer body as claimed in claim 1, wherein the first carrier film has a thickness in the range from 12 to 50 µm.

7. The multilayer body as claimed in claim 1, wherein the second carrier film is a polyester film or an ABS film.

8. The multilayer body as claimed in claim 7, wherein the polyester film has a thickness in the range from 12 to 50 µm or the ABS film has a thickness in the range from 200 µm to 750 µm.

9. The multilayer body as claimed in claim 1, wherein the structural layer comprises a radiation-curable lacquer which is completely cured.

10. The multilayer body as claimed in claim 1, wherein the at least one decorative layer comprises a radiation-curable lacquer which is not completely cured.

11. The multilayer body as claimed in claim 1, wherein the structural layer has a thickness in the range from 5 to 250 µm.

12. The multilayer body as claimed in claim 1, wherein the structural layer has a structure depth in the range from 5 to 250 µm.

13. The multilayer body as claimed in claim 1, wherein neighboring elevated regions and/or neighboring depressed regions of the structural layer have a spacing in the range from 1 µm to 50 cm.

14. The multilayer body as claimed in claim 1, wherein an adhesive layer is arranged directly on the side of the structural layer that is facing away from the first carrier film.

15. The multilayer body as claimed in claim 14, wherein the adhesive layer has a thickness in the range from 0.5 to 4 µm.

16. The multilayer body as claimed in claim 1, wherein the side of the first carrier film that is facing away from the structural layer is uncoated.

17. The multilayer body as claimed in claim 1, wherein the structural layer forms a positive or a negative for a pattern, an alphanumeric character or a pictorial representation.

18. The multilayer body as claimed in claim 1, wherein the at least one decorative layer comprises at least one protective layer and/or at least one layer with a decorative effect.

19. The multilayer body as claimed in claim 18, wherein the decorative effect is produced by an at least partially arranged metal layer and/or an at least partially arranged interference layer and/or an at least partially arranged replicating layer with relief structures, and/or an at least partially arranged color layer and/or an at least partially arranged pigmented layer, which comprises fluorescent, phosphorescent, thermochromic or photochromic pigments or pigments with viewing-angle-dependent color-changing effects.

20. The multilayer body as claimed in claim 1, wherein the structural layer is arranged in register with at least one decoration of at least one of the at least one decorative layer(s).

21. The multilayer body as claimed in claim 1, wherein the multilayer transfer film comprises, adjoining the structural layer in the following sequence, the at least one decorative layer and the second carrier film.

22. The multilayer body as claimed in claim 21, wherein the multilayer transfer film comprises a third carrier film, which is arranged between the structural layer and the at least one decorative layer.

23. The multilayer body as claimed in claim 22, wherein the third carrier film is a polyester film.

* * * * *